US010871175B2

(12) United States Patent
Yamada et al.

(10) Patent No.: US 10,871,175 B2
(45) Date of Patent: Dec. 22, 2020

(54) SPEED CONTROLLER

(71) Applicant: SMC CORPORATION, Chiyoda-ku (JP)

(72) Inventors: Hirosuke Yamada, Tsukubamirai (JP); Naoyuki Suga, Kawaguchi (JP); Akiho Nishimura, Moriya (JP); Masahiko Yoshiwara, Toride (JP)

(73) Assignee: SMC CORPORATION, Chiyoda-ku (JP)

( * ) Notice: Subject to any disclaimer, the term of this patent is extended or adjusted under 35 U.S.C. 154(b) by 204 days.

(21) Appl. No.: 16/308,983

(22) PCT Filed: Apr. 12, 2017

(86) PCT No.: PCT/JP2017/014949
§ 371 (c)(1),
(2) Date: Dec. 11, 2018

(87) PCT Pub. No.: WO2017/221524
PCT Pub. Date: Dec. 28, 2017

(65) Prior Publication Data
US 2020/0182264 A1 Jun. 11, 2020

(30) Foreign Application Priority Data

Jun. 23, 2016 (JP) .................................. 2016-124126
Sep. 1, 2016 (JP) .................................. 2016-171193
Dec. 26, 2016 (JP) .................................. 2016-251884

(51) Int. Cl.
F15B 11/04 (2006.01)
F15B 11/042 (2006.01)
(Continued)

(52) U.S. Cl.
CPC ............ *F15B 11/04* (2013.01); *F15B 11/042* (2013.01); *F15B 11/044* (2013.01); *F15B 11/06* (2013.01); *F15B 15/14* (2013.01); *F16K 27/00* (2013.01)

(58) Field of Classification Search
CPC ....... F15B 11/04; F15B 11/042; F15B 11/044; F15B 11/06; F15B 15/14; F15B 2211/40515; F16K 27/00
See application file for complete search history.

(56) References Cited

U.S. PATENT DOCUMENTS 5,305,777 A 4/1994 Nakamura et al.
6,296,013 B1 * 10/2001 Hosono .................. G05D 16/10
137/493.7

(Continued)

FOREIGN PATENT DOCUMENTS

DE 102016112356 A1 * 1/2018 ......... F16K 31/1223
JP 5-60253 A 3/1993
(Continued)

OTHER PUBLICATIONS

International Search Report dated Jun. 20, 2017 in PCT/JP2017/014949 filed Apr. 12, 2017.

*Primary Examiner* — Abiy Teka
(74) *Attorney, Agent, or Firm* — Oblon, McClelland, Maier & Neustadt, L.L.P.

(57) ABSTRACT

A valve body of a speed controller includes a main body that extends along a first axis and a mounting portion that projects from a side of the main body along a second axis that intersects the first axis orthogonally. A first port, a needle valve, and a check valve are disposed in the main body. The mounting portion, which is a portion to be mounted on a cylinder portion, includes a second port formed therein. A position at which the mounting portion is disposed on the side of the main body is away from the first (Continued)

axis in a direction of a third axis that orthogonally intersects the first axis and the second axis.

13 Claims, 17 Drawing Sheets

(51) Int. Cl.
*F15B 11/044* (2006.01)
*F15B 11/06* (2006.01)
*F15B 15/14* (2006.01)
*F16K 27/00* (2006.01)

(56) References Cited

U.S. PATENT DOCUMENTS

| | | | |
|---|---|---|---|
| 6,439,262 B1* | 8/2002 | Hosono | F15B 11/028 137/382 |
| 6,745,789 B2* | 6/2004 | Christiani | F15B 11/0413 137/102 |
| 10,030,677 B2* | 7/2018 | Shishido | F15B 11/0413 |
| 2012/0273074 A1 | 11/2012 | Yamada et al. | |
| 2017/0261008 A1 | 9/2017 | Hama | |

FOREIGN PATENT DOCUMENTS

| | | |
|---|---|---|
| JP | 2011-19488 A | 8/2011 |
| JP | 2014-129853 A | 7/2014 |
| JP | 5756984 B1 | 7/2015 |

* cited by examiner

SPEED CONTROLLER

TECHNICAL FIELD

The present invention relates to a speed controller that controls working speed of a fluid-pressure cylinder.

BACKGROUND ART

A speed controller is connected to a fluid-pressure circuit to control working speed of a fluid-pressure cylinder. The speed controller is formed of a check valve that allows pressurized fluid to flow in one direction and prevents the flow in the opposite direction and a needle valve that controls the flow rate of the pressurized fluid. The check valve and the needle valve are connected in parallel. The speed controller has a mounting portion with a male thread formed thereon and is configured to be mounted directly on the fluid-pressure cylinder by screwing the mounting portion into a cylinder port of the fluid-pressure cylinder having a female thread formed therein.

FIG. 25 illustrates a speed controller 60 that is known generally. The known speed controller 60 includes a main body 61 and a mounting portion 62 that are connected to each other in series along an axis L and also includes a piping body 63 that is connected orthogonally to a side of the main body 61. A connection port 65 is provided in the mounting portion 62, and a male thread 62a is formed on the outer periphery of the mounting portion 62. A piping port 66 for connection to a pipe is formed at an end of the piping body 63. Inside the main body 61, a first channel 67a and a second channel 67b are disposed in parallel. The first channel 67a and the second channel 67b are part of a channel 67 that connects the connection port 65 and the piping port 66 to each other. A check valve 68 that allows pressurized fluid to flow only in one direction is disposed in the first channel 67a, whereas a needle valve 69 that controls the flow rate of the pressurized fluid is disposed in the second channel 67b. The check valve 68 and the needle valve 69 are disposed coaxially along the axis L.

Since the known speed controller 60 includes the main body 61 and the mounting portion 62 that are connected in series, when the speed controller 60 is mounted on the fluid-pressure cylinder 1 by screwing the mounting portion 62 into the cylinder port 4 in which the female thread 4a is formed, the axis L is aligned with the central axis LP of the cylinder port 4. Accordingly, the main body 61 protrudes considerably in a lateral direction from the fluid-pressure cylinder 1. As a result, when a fluid-pressure cylinder 1 with the speed controller 60 mounted thereon is installed in a fluid-pressure apparatus, such as an industrial robot, a large space is required around the installation point.

On the other hand, Patent Literatures (PTL1 and PTL2) disclose improved speed controllers that are lower in height than the known speed controller 60. Each of the improved speed controllers is formed into such a shape that the mounting portion 62 and the piping body 63 are interchanged with each other with respect to the main body 61 in the known speed controller 60. The main body 61 and the piping body 63 are connected in series along the axis L, while the mounting portion 62 is connected orthogonally to the side of the main body 61.

When the improved speed controller is mounted on the fluid-pressure cylinder, the axis of the main body is aligned with a direction orthogonally intersecting the central axis LP of the cylinder port, which is different from the known speed controller 60. This is advantageous because the height of the lateral protrusion from the fluid-pressure cylinder is considerably small. Thus, only a small space is required for mounting the speed controller 60 on the fluid-pressure cylinder.

In the improved speed controller, however, the mounting portion to be mounted on the cylinder port is connected to the side of the main body via a protruding wall portion that protrudes from the side. As a result, when the speed controller is mounted on the fluid-pressure cylinder, the speed controller protrudes more in the lateral direction from the fluid-pressure cylinder to the extent of the protruding wall portion. Accordingly, there has been a need of further improvement to lower the height of the lateral protrusion. Especially, in recent years, following fluid-pressure apparatuses being subject to downsizing or being used as precision tools, there has been a demand for installing a small fluid-pressure cylinder in a narrower space and consequently for mounting the speed controller on the fluid-pressure cylinder more compactly.

CITATION LIST

Patent Literature

PTL 1: Japanese Patent No. 5756984
PTL 2: Japanese Unexamined Patent Application Publication No. 5-60253

SUMMARY OF INVENTION

Technical Problem

A technical problem of the present invention is to provide a speed controller having a reasonable design structure such that the speed controller can be mounted on a fluid-pressure cylinder more compactly by further lowering the height of a valve body compared with a known speed controller.

Solution to Problem

In order to solve the above problem, the present invention is characterized by providing a speed controller that includes a check valve that controls a flow direction of pressurized fluid in a fluid channel that connects a first port and a second port to each other and also includes a needle valve that controls flow rate of the pressurized fluid supplied to a fluid-pressure cylinder or discharged from the fluid-pressure cylinder. In the speed controller, a valve body of the speed controller includes a main body that extends along a first axis and a mounting portion to be mounted on a cylinder port of the fluid-pressure cylinder, the mounting portion projects from a side of the main body along a second axis that intersects the first axis orthogonally, the first port is formed in the main body and the needle valve and the check valve are disposed coaxially along the first axis, the second port is formed in the mounting portion, and a position at which the mounting body is connected to the side of the main body is away from the first axis in a direction of a third axis that orthogonally intersects the first axis and the second axis.

According to a concrete feature of the present invention, in the speed controller, a bulging portion that projects in a direction of the third axis is formed on the side of the main body, and the mounting portion is disposed in the bulging portion so as to protrude out of the bulging portion along the second axis.

In this case, it is preferable that in the speed controller, a height of the bulging portion in a direction of the second axis be equal to or less than a diameter of the main body in the direction of the second axis.

In the speed controller, it is also preferable that a connection hole that is shaped circularly and extends along the second axis be formed in the bulging portion and the connection hole be in communication with the fluid channel, that the mounting portion be formed in a mounting body that is shaped cylindrically and separated from the main body, that a connection portion for engaging the inside of the connection hole be formed in the mounting body, and that a channel hole that connects the second port and the connection hole to each other be also formed in the mounting body.

In the speed controller, it is further preferable that the connection hole pass through the bulging portion, that an end of the connection portion be exposed to outside from the connection hole, and that a handling hole for engaging a wrench be formed at the end of the connection portion.

In addition, the connection hole may pass through the bulging portion and an end of the connection portion protrudes out of the connection hole, and the main body and the mounting body may be detachably connected to each other by detachably attaching a locking member to the end of the connection portion, the locking member causing the connection portion and the bulging portion to lock each other. Moreover, a handling hole for engaging a wrench may be formed at the end of the connection portion.

In this case, the main body and the mounting body may be connected so as to be rotatable around the second axis relative to each other.

According to a concrete feature of the present invention, in the speed controller, the fluid channel is branched into a first channel and a second channel which are disposed parallel to each other, and the check valve is disposed in the first channel and the needle valve is disposed in the second channel.

According to another concrete feature of the present invention, in the speed controller, the main body includes a discharge hole through which pressurized fluid from the fluid-pressure cylinder is discharged, a discharge channel that is branched from the fluid channel and is in communication with the discharge hole, a valve chamber formed at a position at which the discharge channel is branched from the fluid channel, and a supply valve seating and a discharge valve seating that are disposed so as to oppose each other in the valve chamber and to surround the fluid channel and the discharge channel, respectively. In addition, the check valve is disposed in the valve chamber at a position between the supply valve seating and the discharge valve seating. Moreover, in the case in which the pressurized fluid from the first port acts on the check valve, the check valve is seated on the discharge valve seating and thereby causes the first port and the second port to be in communication with each other and closes the discharge channel, and in a case in which the pressurized fluid from the second port acts on the check valve, the check valve is seated on the supply valve seating and thereby causes the first port and the second port to be isolated from each other and causes the second port to be in communication with the discharge channel.

The check valve is shaped like a disk. In the speed controller, it is desirable that the discharge hole be formed inside a hollow discharge portion that is formed on the side of the main body so as to extend along a fourth axis that is parallel to the second axis and orthogonally intersects the first axis, and that a silencer that be made of a porous member be accommodated inside the discharge hole. In this case, it is desirable that the discharge portion be formed on a side of the bulging portion so as to extend along the bulging portion, and that a height of the discharge portion in a direction of the fourth axis be equal to or less than a height of the bulging portion.

According to another concrete feature of the present invention, in the speed controller, the needle valve is configured to advance/retreat along the first axis by manipulating a handle and an aperture area of a flow regulating hole is adjusted by the advance/retreat of the needle valve. In addition, the handle is displaceable between a non-locking position at which advancing/retreating operation of the needle valve is enabled and a locking position at which the advancing/retreating operation of the needle valve is disabled. Moreover, the valve body includes an indicator portion disposed therein for indicating whether the handle is at the locking position or at the non-locking position.

Advantageous Effects of Invention

When the speed controller according to the present invention is mounted on the cylinder port of the fluid-pressure cylinder, the first axis that is the central axis of the main body is oriented in a direction orthogonally intersecting the central axis of the cylinder port. The protruding amount of the main body that protrudes laterally from the fluid-pressure cylinder thereby becomes substantially equal to the width of the main body in the direction of the second axis, which is substantially smaller compared with the known speed controller. Thus, the speed controller can be mounted on the fluid-pressure cylinder more compactly than before.

DESCRIPTION OF EMBODIMENTS

Figure 7:
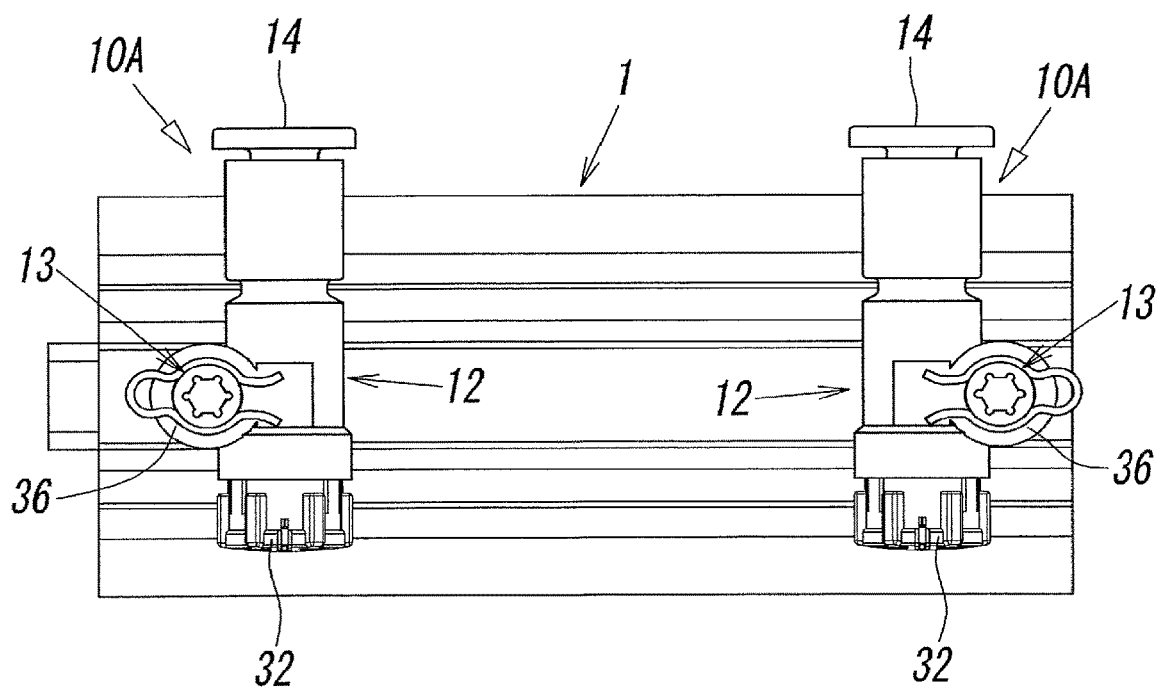
FIG. 7 is a plan view illustrating a fluid-pressure cylinder on which the speed controller according to the present invention is mounted.
Figure 8:
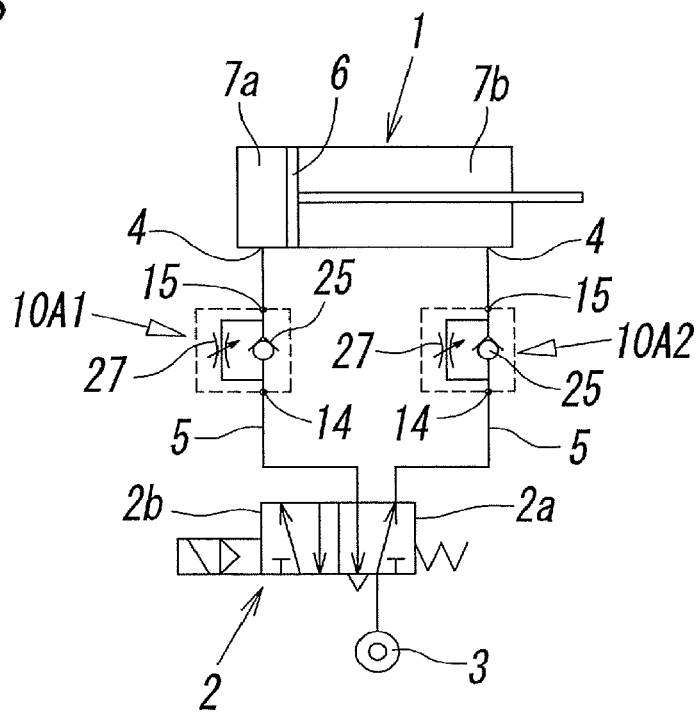
FIG. 8 is a circuit diagram when the speed controller according to the present invention controls the working speed of the fluid-pressure cylinder.

FIGS. 1 to 6 illustrate a speed controller according to a first embodiment of the present invention, and FIG. 7 illustrates a state in which the speed controller 10A is mounted on a fluid-pressure cylinder 1. FIG. 8 illustrates an example of a fluid-pressure circuit for controlling the speed of the fluid-pressure cylinder 1 by using the speed controller 10A. Reference numeral 2 in FIG. 8 denotes an electromagnetic valve having 5 ports, and reference numeral 3 denotes a supply source of pressurized fluid. The pressurized fluid is compressed air.

The speed controller 10A is directly mounted on a cylinder port 4 of the fluid-pressure cylinder 1. The speed controller 10A is a speed controller using a meter-in control system in which the working speed of the fluid-pressure cylinder 1 is controlled by regulating the supply flow rate of pressurized fluid supplied to the fluid-pressure cylinder 1.

With reference to FIGS. 1 to 6, the speed controller 10A includes a valve body 11. The valve body 11 includes a main body 12 that extends along a first axis L1 and is shaped substantially like a cylinder and also includes a mounting body 13 that is connected to a side of the main body 12 so as to extend along a second axis L2 that intersects the first axis L1 orthogonally and is shaped substantially like a cylinder.

A first port 14 is formed in the main body 12 for connection with a pipe 5 (see FIG. 8) that comes from an electromagnetic valve 2. A second port 15 is formed in the mounting body 13 for connection with the cylinder port 4 of the fluid-pressure cylinder 1. The first port 14 and the second port 15 are connected by a fluid channel 16 that is formed inside the main body 12 and the mounting body 13.

The main body 12 includes a valve accommodation portion 12a that is formed in a half portion of the main body 12 in a direction along the first axis L1 and also includes a port-formed portion 12b that is formed in the other half portion. The first port 14 is formed in the port-formed portion 12b so as to open in the direction of the first axis L1, and a pipe joint 17 having a simplified connection system is attached to the first port 14.

The pipe joint 17 is formed such that when an end of the pipe 5 is inserted into the pipe joint 17, a plurality of locking leaves 17a bite and lock the outer periphery of the pipe 5 to prevent the pipe 5 from coming out, and when a release bush 17b is pressed into the pipe joint 17, the end of the release bush 17b presses the locking leaves 17a outward and separates the locking leaves 17a from the pipe 5 to allow the pipe 5 to be pulled out.

In the hollow interior of the valve accommodation portion 12a, a check valve holder 20 and a needle valve holder 21 are arranged serially and formed coaxially along the first axis L1. The check valve holder 20 is shaped like a cylinder, and the needle valve holder 21 is also shaped like a cylinder and has different inside-diameter and outside-diameter portions. The check valve holder 20 branches a portion of the fluid channel 16 into a first channel 16a and a second channel 16b that are arranged parallel to each other. Reference numeral 23 in figures denotes a sealing member. The check valve holder 20 and the needle valve holder 21 are made integrally from a synthetic resin.

The first channel 16a is an annular channel formed between the outer periphery of the check valve holder 20 and the inner periphery of the main body 12. The second channel 16b is a flow channel that passes through the center hole 22 of the check valve holder 20. The first channel 16a and the second channel 16b are merged into a confluence section 16c that is formed between the check valve holder 20 and the needle valve holder 21 and are in communication with a connection hole 37 that is provided for connection with the mounting body 13.

A check valve 25 is disposed inside the first channel 16a. The check valve 25 is a lip-type check valve that restricts the flow of the pressurized fluid in the first channel 16a to one direction. The check valve 25 is disposed in a recess 20a formed in the outer periphery of the check valve holder 20 and has a lip 25a that deforms due to the action of the pressurized fluid. The lip 25a is separated from, or brought into contact with, a seating portion 26 on the inner periphery of the main body 12 and thereby opens or closes the first channel 16a. In the illustrated example, the lip 25a faces upstream in the first channel 16a, in other words, faces toward the first port 14. Accordingly, the lip 25a prevents a forward flow of the pressurized fluid from the first port 14 toward the second port 15 by coming into contact with the seating portion 26 and closing the first channel 16a. The lip 25a allows a backward flow of the pressurized fluid from the second port 15 toward the first port 14 by separating from the seating portion 26 and opening the first channel 16a.

A needle valve 27 is disposed in a valve hole 21a inside the needle valve holder 21 with a valve sealing 28 interposed therebetween. The needle valve 27 is movable along the first axis L1 in an airtight manner. A flow regulating portion 27a, which is disposed at an end of the needle valve 27, is inserted into the center hole 22 of the check valve holder 20. The flow regulating portion 27a is provided with a flow regulating hole 29 on a side thereof. The flow regulating hole 29 inclines in a direction in which a cross-sectional area of the flow regulating hole 29 becomes larger as the distance to the end of the flow regulating portion 27a becomes smaller. As the needle valve 27 advances and the amount of entry of the flow regulating portion 27a into the center hole 22 becomes larger, the aperture area of the flow regulating hole 29 (accordingly the second channel 16b) becomes smaller. On the other hand, as the needle valve 27 retreats and the amount of entry of the flow regulating portion 27a into the center hole 22 becomes smaller, the aperture area of the flow regulating hole 29 (accordingly the second channel 16b) becomes larger. Thus, the flow rate of the pressurized fluid flowing in the second channel 16b can be controlled.

A male thread 30 is formed on the outer periphery of the needle valve 27 for causing the needle valve 27 to advance or retreat. The male thread 30 intermeshes with a threaded hole 31a of a needle guide 31 that is fixed inside the needle valve holder 21. A handle 32 is connected to the end of the needle valve 27. The handle 32 is shaped like a cap and provided for a rotation operation. The handle 32 is rotatably attached to the end of the needle valve holder 21 that protrudes out of the valve accommodation portion 12a. The end of the needle valve 27 is inserted into a handling hole 33 that is formed at the center of the handle 32. In this state, the end of the needle valve 27 is movable relative to the handling hole 33 in the direction of the first axis L1 while the end of the needle valve 27 is not movable relative to the handling hole 33 in a rotation direction around the first axis L1. Accordingly, when the handle 32 is turned in a forward or a reverse direction, the needle valve 27 is turned in the forward or the reverse direction, and thereby the needle valve 27, which is guided by the needle guide 31, advances or retreats in the direction of the first axis L1.

An indication 34 is provided on the outer surface of the handle 32 for indicating the relation between the rotational direction of the handle 32 and the degree of openness of the needle valve 27. A projection 35 is disposed on the side surface of the handle 32 for serving as a pointer to indicate a rotation direction, a degree of rotation, or the like.

Figure 4:
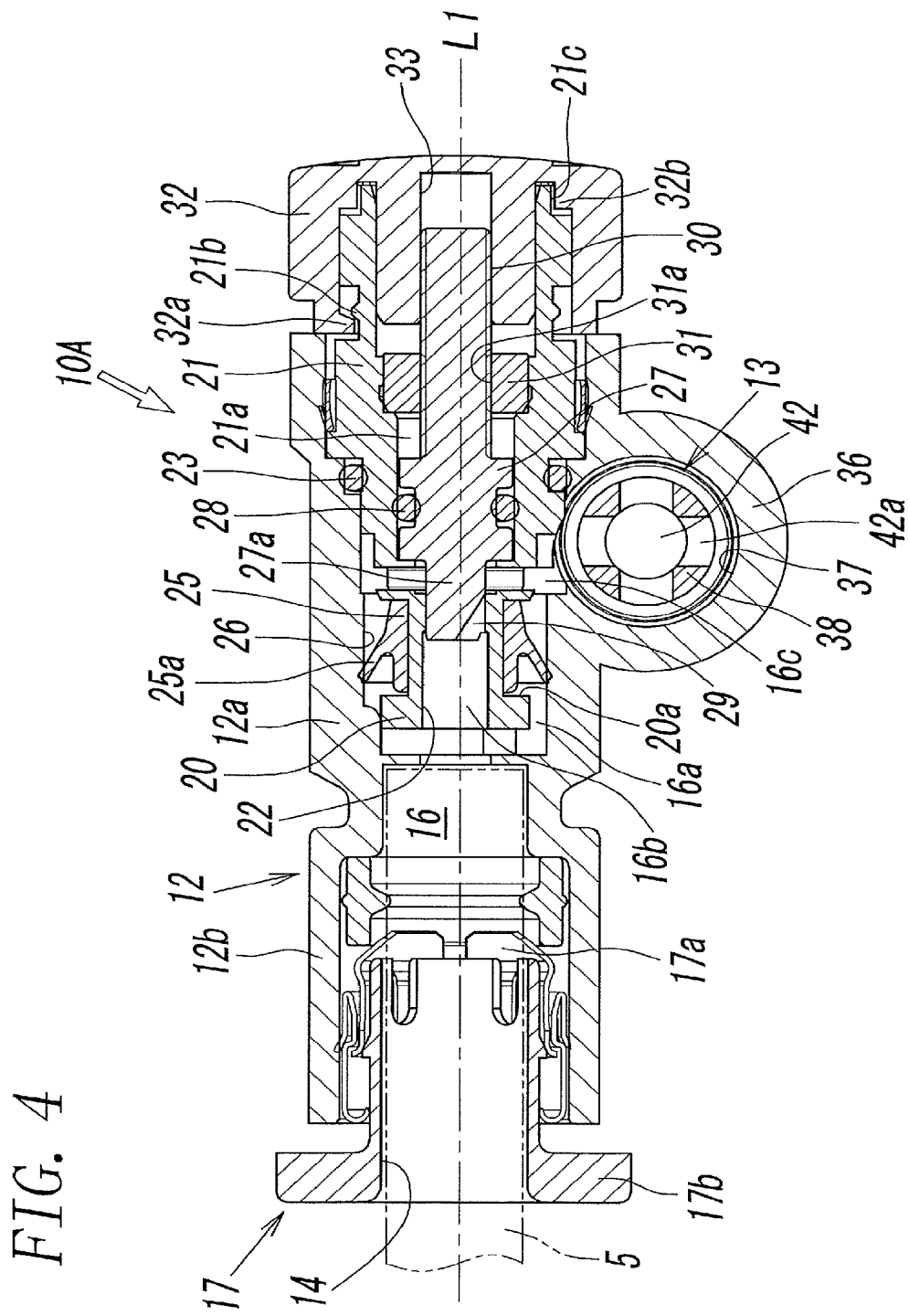
FIG. 4 is a cross section taken along line IV-IV in FIG. 1 and illustrating a state in which a handle is at a locking position.
Figure 5:
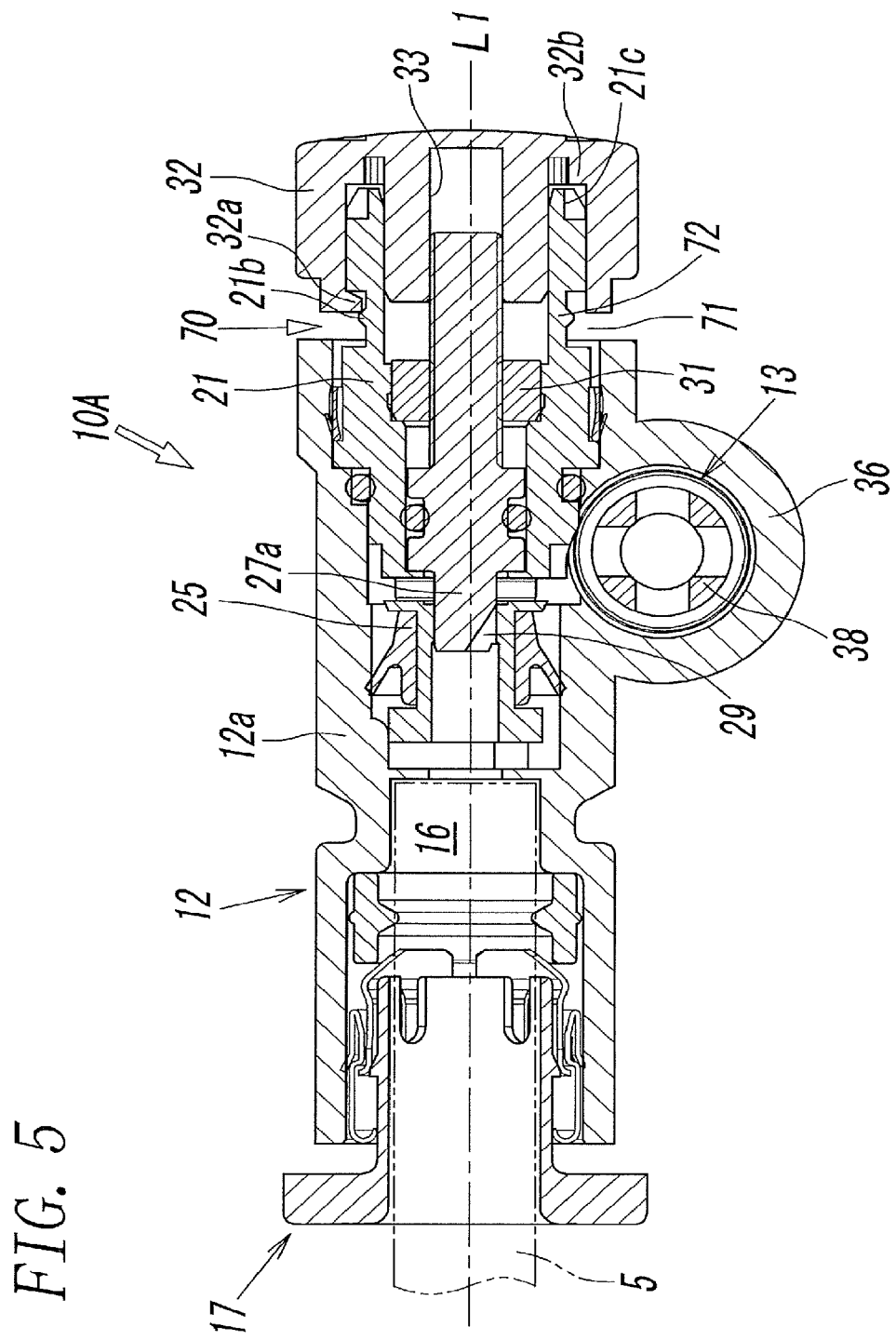
FIG. 5 is the cross section in a case in which the handle is moved from the state in FIG. 4 to a non-locking position.
Figure 6:
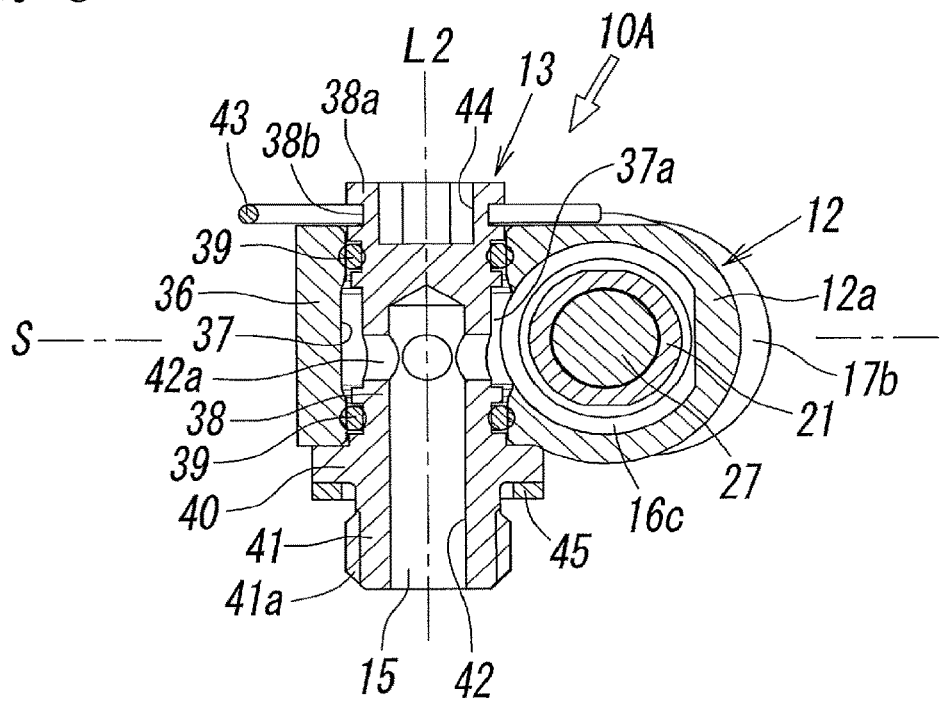
FIG. 6 is a cross section taken along line VI-VI in FIG. 1.

The handle 32 also can advance or retreat along the first axis L1 and can be displaced between a locking position (advance position) as illustrated in FIG. 4 and a non-locking position (retreat position) as illustrated in FIG. 5. The advance or retreat of the needle valve 27 is performed by using the handle 32 while the handle 32 is at the non-locking position. After finishing the advance or retreat, the handle 32 is moved forward to assume the locking position. A projection 32a disposed on the inner periphery of the end of the handle 32 thereby engages a projection 21b on the outer periphery of the needle valve holder 21, and the handle 32 is held at the position. Simultaneously, a key 32b disposed on the inner periphery and at the bottom end in the handle 32 engages a key groove 21c disposed on the outer periphery and at the end of the needle valve holder 21. The rotation of the handle 32 is thereby restricted, which prevents the needle valve 27 from advancing or retreating.

An indicator portion 70 is disposed on the main body 12 for enabling recognition of whether the handle 32 is at the locking position or at the non-locking position. In the illustrated example, the indicator portion 70 is formed so as to indicate that the handle 32 is at the non-locking position. The indicator portion 70 is formed of a marker portion 72 that is formed on the needle valve holder 21 and of a space 71 that appears between the handle 32 and the main body 12 when the handle 32 is displaced to the non-locking position illustrated in FIG. 5. By viewing the marker portion 72 through the space 71, it can be recognized that the handle 32 is at the non-locking position. When the handle 32 is displaced to the locking position illustrated in FIG. 4, the handle 32 closes the space 71 so that the marker portion 72 cannot be viewed.

However, the indicator portion 70 may be configured such that the space 71 is formed as a hole, a notch, or the like, on the side of the handle 32 and when the handle 32 is displaced to the non-locking position, the marker portion 72 is exposed in the space 71.

Moreover, the indicator portion 70 may be formed so as to indicate that the handle 32 is at the locking position. In this case, when the handle 32 is displaced to the locking position, the marker portion 72 may be exposed through the space 71 that is formed as a hole, a notch, or the like, in the handle 32.

The marker portion 72 may be a color or a letter. In the case in which the marker portion 72 is formed by using a color, only a portion of the needle valve holder 21 may be painted with a conspicuous color (for example, orange or red) that is different from that of the other portion, or alternatively, the entire portion of the needle valve holder 21 may be painted with such a color. Alternatively, the marker portion 72 can be formed by painting the outer surface of the needle valve holder 21 or can be formed by molding a synthetic resin in which paint is mixed into a portion of, or the entire portion of, the needle valve holder 21. In the illustrated embodiment, the entire portion of the needle valve holder 21 is made from a synthetic resin with a paint mixed therein.

Alternatively, in the case of forming the identification portion 72 by using letters, letters such as "OPEN" or "UNLOCK", for example, may be printed on the side of the needle valve holder 21, and these letters may be viewed through the space. These letters are desirably written in a conspicuous color.

A bulging portion 36 is formed on a side of the valve accommodation portion 12a of the main body 12 for connection with the mounting body 13. The bulging portion 36 protrudes in a direction of a third axis L3 that orthogonally intersects both the first axis L1 and the second axis L2. The bulging portion 36 is a semicircular shape in plan view. It is preferable that the height H of the bulging portion 36 in the direction of the second axis L2 be substantially the same as, or a little smaller than, the maximum diameter of the valve accommodation portion 12a, in other words, the diameter D in the direction of the second axis L2.

The bulging portion 36 has a first end surface 36a (top surface in the figure) that is a surface of one end thereof in the direction of the second axis L2 and a second end surface 36b (bottom surface in the figure) that is opposite to the one end. The first end surface 36a and the second end surface 36b are flat surfaces that orthogonally intersect the direction of the second axis L2.

The connection hole 37 that is shaped circularly is formed inside the bulging portion 36 at a position a predetermined distance X away from the first axis L1 in the direction of the third axis L3. The connection hole 37 is formed so as to pass through the bulging portion 36 in the direction of the second axis L2. The connection hole 37 is in communication with a hollow portion of the valve accommodation portion 12a via an opening 37a formed in the side of the connection hole 37. The hollow portion is, in other words, the confluence section 16c into which the first channel 16a and the second channel 16b are merged. The mounting body 13 is connected to the main body 12 in such a manner that a connection portion 38 of the mounting body 13 is inserted airtightly into the connection hole 37 via sealing members 39 that are disposed at positions straddling the opening 37a. Accordingly, the position at which the mounting body 13 is connected to the main body 12 is a position a predetermined distance X away from the first axis L1 in the direction of the third axis L3. It is desirable that the distance X be larger than a half of the diameter D of the body 12 and be less than or equal to the diameter D.

The mounting body 13 is a member separated from the main body 12. The mounting body 13 includes, in order in the longitudinal direction (in the direction of the second axis L2), the connection portion 38, a seat portion 40 that abuts an end surface of the bulging portion 36, and a mounting portion 41 for mounting on the cylinder port 4 of the fluid-pressure cylinder 1. The second port 15 is formed in the mounting portion 41 so as to open in the direction of the second axis L2. A male thread 41a is formed on the outer periphery of the mounting portion 41. The speed controller 10A is mounted on the fluid-pressure cylinder 1 by screwing the mounting portion 41 into the cylinder port 4 in which a female thread 4a is formed on the inner periphery thereof. Reference numeral 45 in the figure denotes a gasket.

Inside the mounting body 13, a channel hole 42 extends along the second axis L2 to a middle portion of the connection portion 38. The channel hole 42 is in communication with the second port 15. On the side surface of the mounting body 13, a plurality of the communication holes 42a are formed in radial directions. The channel hole 42 communicates with the opening 37a through the communication holes 42a. Thus, the channel hole 42, communication holes 42a, and connection hole 37 form part of the fluid channel 16.

The length of the connection portion 38 in the direction of the second axis L2 is a little longer than the length of the connection hole 37. The length of the mounting portion 41 in the direction of the second axis L2 is shorter than the length of the connection portion 38. The length of the seat portion 40 in the direction of the second axis L2 (i.e., thickness) is shorter than the length of the mounting portion 41. In the illustrated example, the sum of the height H of the bulging portion 36 and the thickness of the seat portion 40 is set at a value smaller than, or equal to, the diameter D of the body 12.

A locking groove 38b is formed on the outer periphery of an end portion 38a of the connection portion 38. The locking groove 38b is provided for unlockably locking a locking member 43. A work hole 44 that is shaped like a hexagon is formed in the end surface of the end portion 38a. A hexagonal wrench is inserted into the work hole 44 to rotate the mounting body 13 when mounted on the cylinder port 4.

Note that the outer periphery of the seat portion 40 may be formed, for example, into a hexagonal shape with which the mounting body 13 can be rotated by using a wrench.

The locking member 43 is formed as a clip 43A that is shaped substantially like a letter "U". The clip 43A includes a pair of right and left locking arms 46a that can deform elastically and also includes a handle portion 46b that is formed into a semicircle at a position at which proximal ends of the pair of locking arms 46a are joined. Curved portions 46c that are curved so as to protrude convexly outward are formed in the middle of the pair of respective locking arms 46a. End portions 46d of the pair of locking arms 46a are bent so as to spread out like a fan.

Figure 2:
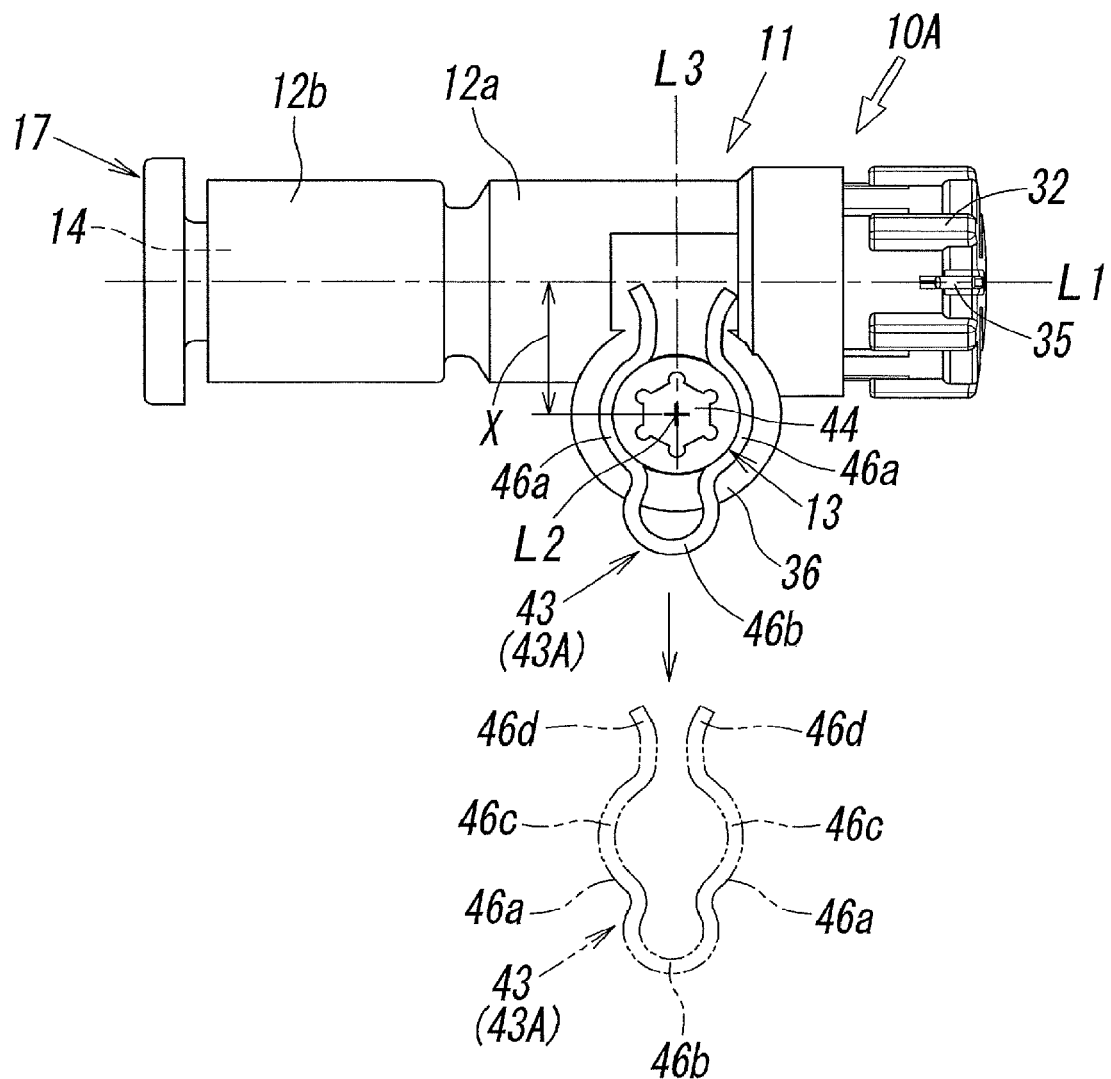
FIG. 2 is a plan view illustrating the speed controller of FIG. 1.

When the clip 43A is mounted on the connection portion 38 of the mounting body 13, as indicated by the solid line in FIG. 2, from a state indicated by the dotted line, the end portions 46d of the pair of locking arms 46a are pressed against the side surfaces of the connection portion 38 at the position of the locking groove 38b, and in this state, the clip 43A is further pressed. Consequently, the pair of locking arms 46a is opened elastically by the connection portion 38, and then the curved portions 46c proceed to a position of engagement with the locking groove 38b and engages the locking groove 38b at the position.

On the other hand, when the clip 43A is removed from the connection portion 38, the clip 43A is pulled strongly in the arrow direction while the handle portion 46b is held. As a result, the pair of locking arms 46a are opened elastically by the connection portion 38, and then the curved portions 46c move to a position at which the curved portion 46c are released from the locking groove 38b. Thus, the clip 43A is removed from the connection portion 38 to the position indicated by the dotted line. At this time, the clip 43A is separated completely from the connection portion 38 and from the bulging portion 36.

When the mounting body 13 is mounted on the main body 12, the connection portion 38 is inserted into the connection hole 37 of the bulging portion 36 from the bottom surface 36b of the bulging portion 36. When the end portion 38a of the connection portion 38 protrudes out from the top surface 36a of the bulging portion 36, the locking member 43 is elastically installed in the locking groove 38b. The locking member 43 thereby locks the top surface 36a of the bulging portion 36. Thus, the main body 12 and the mounting body 13 are detachably joined to each other. At this time, the seat portion 40 abuts the bottom surface 36b of the bulging portion 36, and the mounting portion 41 protrudes in the direction of the second axis L2 via the seat portion 40 from the bottom surface 36b of the bulging portion 36.

Figure 1:
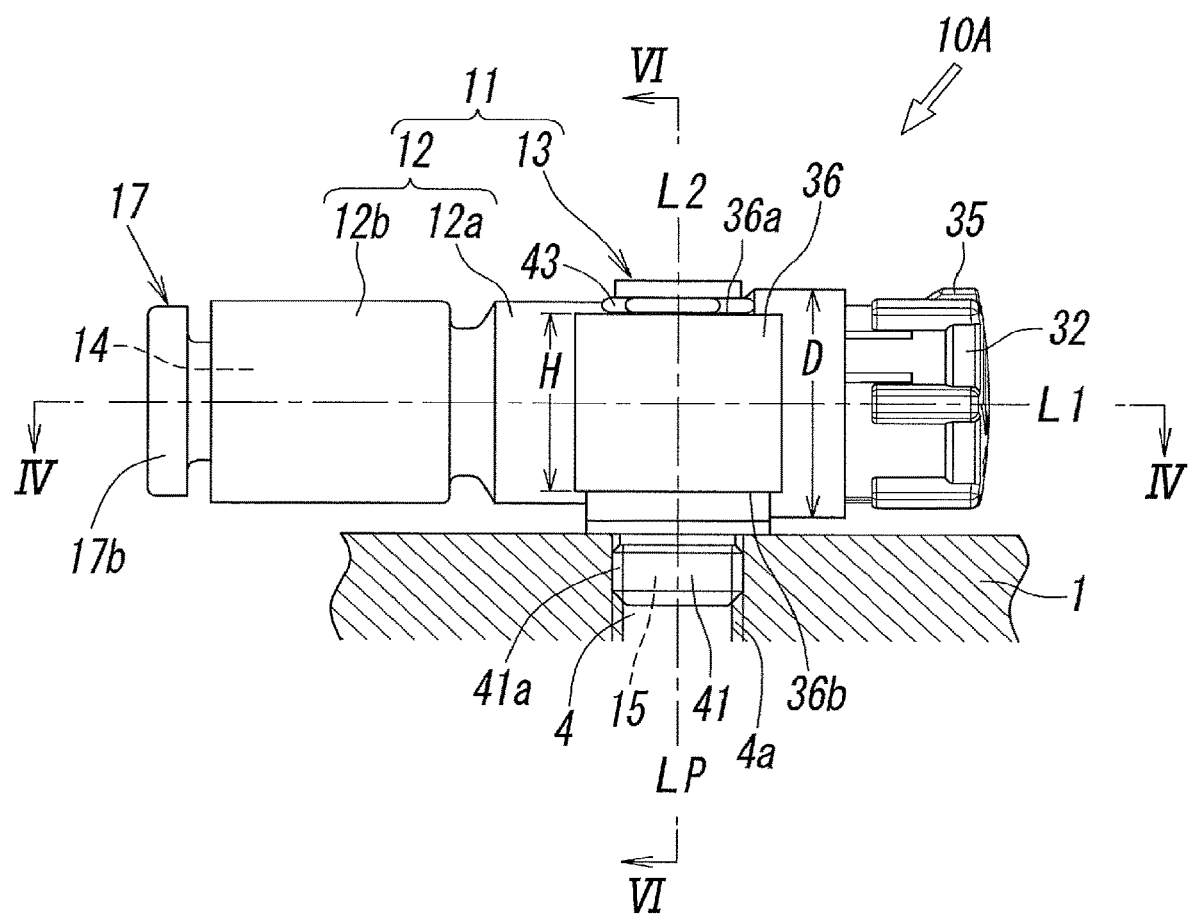
FIG. 1 is a side view illustrating a speed controller according to a first embodiment of the invention.

As illustrated in FIGS. 1 and 7, the speed controller 10A configured as described above is mounted on the fluid-pressure cylinder 1 by screwing the mounting portion 41 into the cylinder port 4 of the fluid-pressure cylinder 1. At this time, the mounting body 13 may be detached beforehand from the main body 12, and only the mounting body 13 may be connected to the cylinder port 4. Subsequently, the main body 12 is connected to the mounting body 13. This makes it easier to mount the speed controller 10A on the fluid-pressure cylinder 1 even in the case of limited work space.

When the mounting body 13 is detached from the main body 12, the locking member 43 is first removed, and then the connection portion 38 is pulled out of the connection hole 37.

When the mounting body 13 is connected to the cylinder port 4, a hexagonal wrench inserted in the work hole 44 of the top surface of the mounting body 13 is used to turn the mounting body 13 and screw the mounting portion 41 fully into the cylinder port 4 until the seat portion 40 abuts the outer surface of the fluid-pressure cylinder 1 with the gasket 45 interposed therebetween.

When the mounting body 13 is mounted on the main body 12, the connection portion 38 of the mounting body 13 is inserted into the connection hole 37 of the main body 12, and the locking member 43 is installed in the locking groove 38b of the end portion 38a of the connection portion 38 that protrudes out of the connection hole 37.

However, the speed controller 10A can be mounted on the cylinder port 4 while the main body 12 and the mounting body 13 remain connected to each other.

If the seat portion 40 is formed so as to engage a wrench, the mounting portion 41 can be screwed into the cylinder port 4 by using the seat portion 40.

Figure 25:
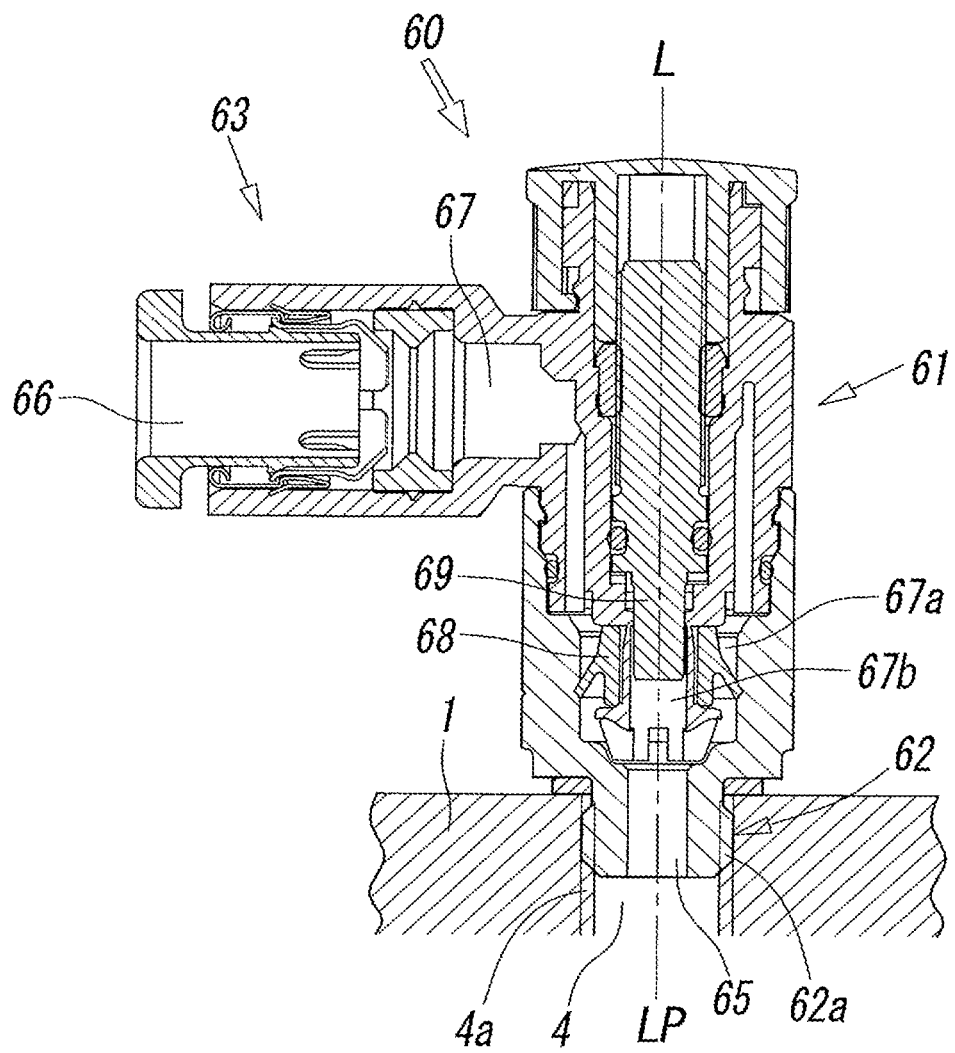
FIG. 25 is a cross-sectional view illustrating an example of a known speed controller.

When the speed controller 10A is mounted on the fluid-pressure cylinder 1 as described above, the main body 12 (the first axis L1) is oriented in a direction orthogonally intersecting the central axis LP of the cylinder port 4. In this case, the protruding amount of the speed controller 10A that protrudes laterally from the fluid-pressure cylinder 1 is equal to the width of the main body 12 in the direction of the second axis L2, in other words, the diameter D. This protruding amount is substantially smaller than that of a speed controller 60 of a known type as illustrated in FIG. 25, in which the main body 61 is oriented toward the central axis LP of the cylinder port 4.

Moreover, the position at which the mounting portion 41 is disposed on the side of the main body 12 is a position not immediately under the main body but at the bottom surface 36b of the bulging portion 36 that bulges laterally from the main body 12. Accordingly, the protruding amount is still smaller compared with an improved-type speed controller disclosed in PTL1 in which the mounting portion is connected to the main body via the protruding wall portion that protrudes downward from the side of the main body. Thus, the speed controller 10A can be mounted on the fluid-pressure cylinder 1 very compactly compared with any type of known speed controller.

Note that in the illustrated example, the end portion 38a of the mounting body 13 protrudes upward slightly from the main body 12. However, adjusting the height H of the bulging portion 36 can prevent the end portion 38a from protruding from the main body 12.

The exterior of the fluid-pressure cylinder 1 is shaped substantially like a rectangle. However, the speed controller 10A can be mounted on the fluid-pressure cylinder 1 that has an exterior shaped circularly.

Moreover, although the main body 12 and the mounting body 13 may be fixedly connected to each other, it is preferable that the main body 12 and the mounting body 13 be connected to each other so as to be rotatable around the second axis L2 relative to each other. The rotatable angle may be limited to 90 degrees, 180 degrees, or the like. The rotatable angle may be 360 degrees so as to allow free rotation. With this configuration, the orientation of the first port 14 can be changed freely so as to be aligned with the connection direction of the pipe 5 after the speed controller 10A is mounted on the fluid-pressure cylinder 1.

It is also desirable that the main body 12 can be connected to the mounting body 13 invertedly in the direction of the second axis L2 (in the up-down direction in FIG. 1). In other words, the main body 12 can be connected to the mounting body 13 while the orientation of the main body 12 is inverted from the state illustrated in FIG. 1 to the state in which the first end surface 36a of the bulging portion 36 faces downward and the second end surface 36b faces upward. This can be achieved, for example, by forming the bulging portion 36 and the connection hole 37 of the main body 12 symmetrically with respect to a virtual plane S (see FIG. 6) that includes the first axis L1 and is perpendicular to the second axis L2.

Figure 3:
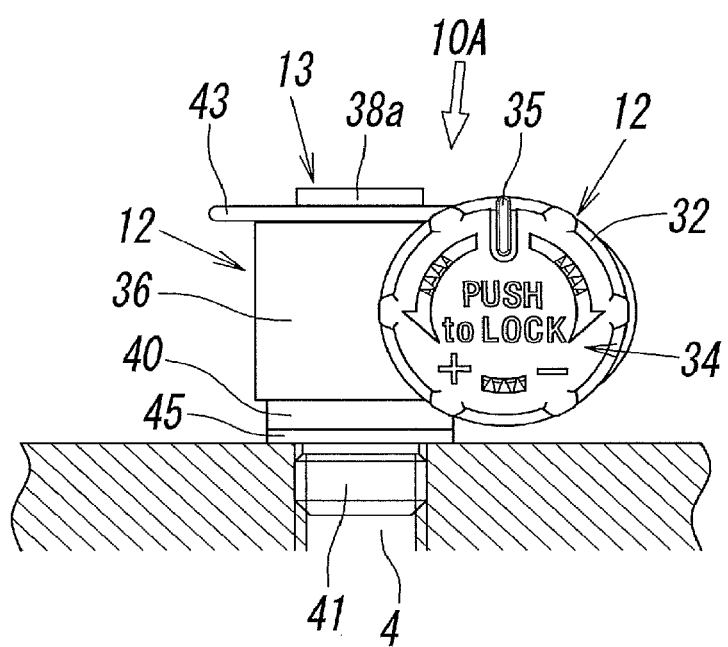
FIG. 3 is a front view illustrating the speed controller of FIG. 1.

With this configuration, in FIG. 3, the orientation of the main body 12 relative to the mounting body 13 can be changed rightward or leftward in accordance with the direction of the pipe 5 being connected to the first port 14.

Note that in the above-described embodiment, the locking member 43 is formed as the elastic clip 43A having a U-shape. However, the locking member 43 is not limited to a clip but may be formed, for example, into a nut. If the locking member 43 is formed into a nut, a male thread is formed on the outer periphery of the end portion 38a of the connection portion 38.

Next, operation of the speed controller 10A will be described with reference to FIG. 8 when the speed controller 10A is used to control the speed of the fluid-pressure cylinder 1.

FIG. 8 illustrates a case in which the electromagnetic valve 2 has been switched to a first position 2a by turning off the power and a piston 6 of the fluid-pressure cylinder 1 is at a retreat end position. At this time, pressurized fluid is supplied to a rod-side chamber 7b of the fluid-pressure cylinder 1 in such a manner that the needle valve 27 of a second speed controller 10A2 regulates the flow rate, while a head-side chamber 7a is open to the atmosphere via the check valve 25 of a first speed controller 10A1.

When the electromagnetic valve 2 is switched from this state to a second position 2b by turning on the power, the first port 14 of the first speed controller 10A1 is connected to a pressurized fluid source 3 and the first port 14 of the second speed controller 10A2 is open to the atmosphere. The pressurized fluid is thereby supplied to the head-side chamber 7a of the fluid-pressure cylinder 1 while the needle valve 27 in the first channel 16a of the first speed controller 10A1 regulates the flow rate. The pressurized fluid in the rod-side chamber 7b is discharged into the atmosphere in free-flow conditions through the check valve 25 in the second channel 16b of the second speed controller 10A2. Thus, the piston 6 of the fluid-pressure cylinder 1 advances at a speed corresponding to the flow rate of the fluid supplied.

When the electromagnetic valve 2 is switched again to the first position 2a after the piston 6 reaches an advanced end position, the first speed controller 10A1 and the second speed controller 10A2 operate in reverse of the operation of advancing the piston 6. Thus, the piston 6 retreats to the retreat end position in FIG. 9.

The speed controller 10A according to the embodiment described above is a type of speed controller using a meter-in control system. However, the speed controller 10A can be replaced with a speed controller using a meter-out control system by changing the orientation of the lip 25a of the check valve 25 so as to face downstream of the first channel 16a in FIG. 4, in other words, to face toward the second port 15. The speed controller of the meter-out control system allows a forward flow of the pressurized fluid as a free flow from the first port 14 toward the second port 15 and regulates the flow rate of a reverse flow of the pressurized fluid from the second port 15 toward the first port 14.

Figure 9:
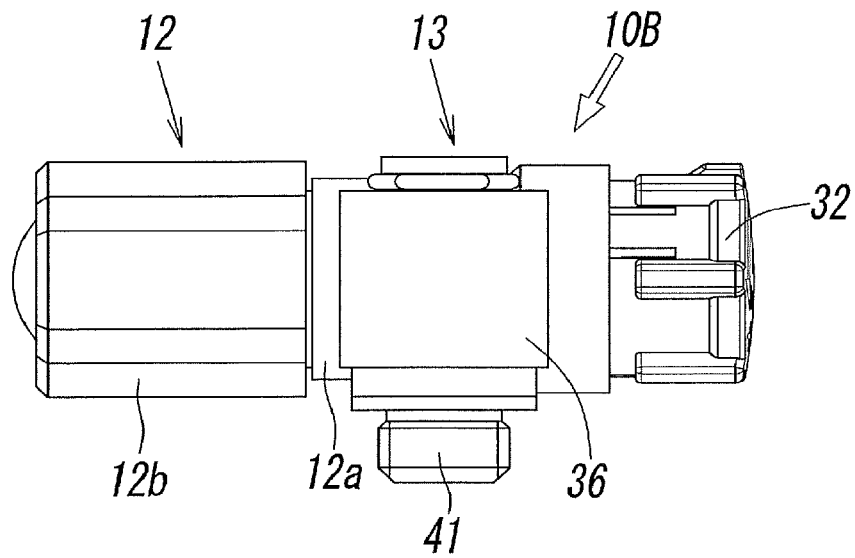
FIG. 9 is a side view illustrating the speed controller according to a second embodiment of the present invention.
Figure 10:
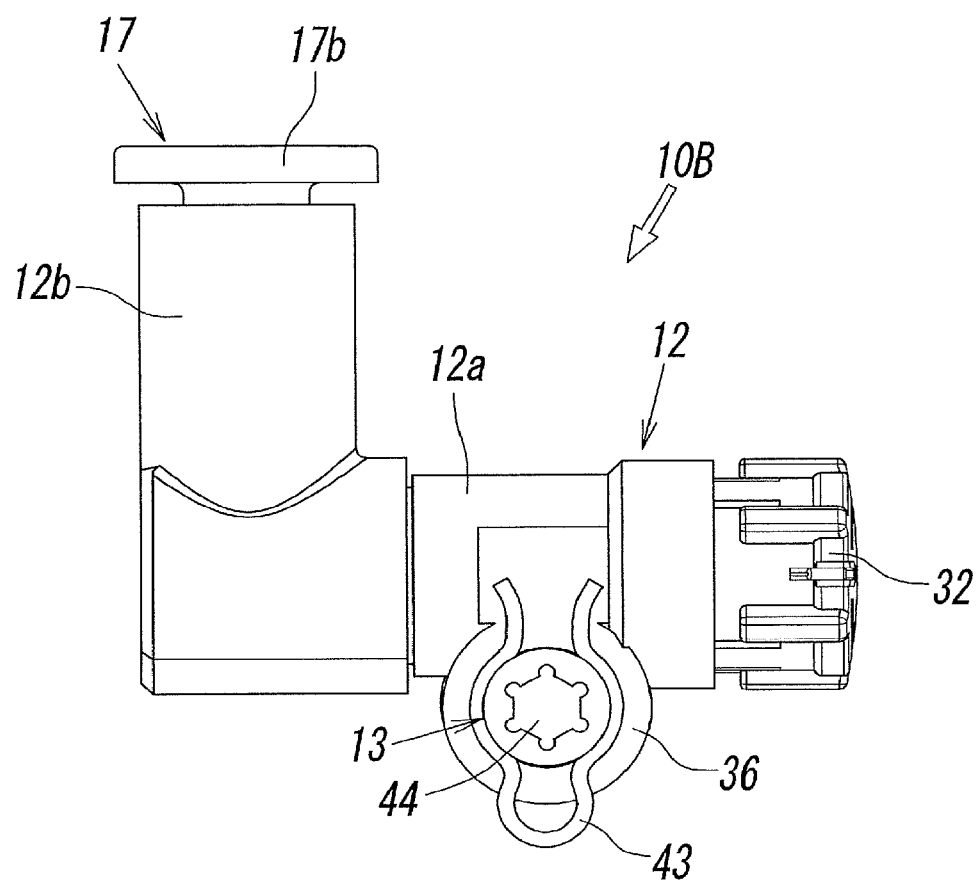
FIG. 10 is a plan view illustrating the speed controller of FIG. 9.
Figure 11:
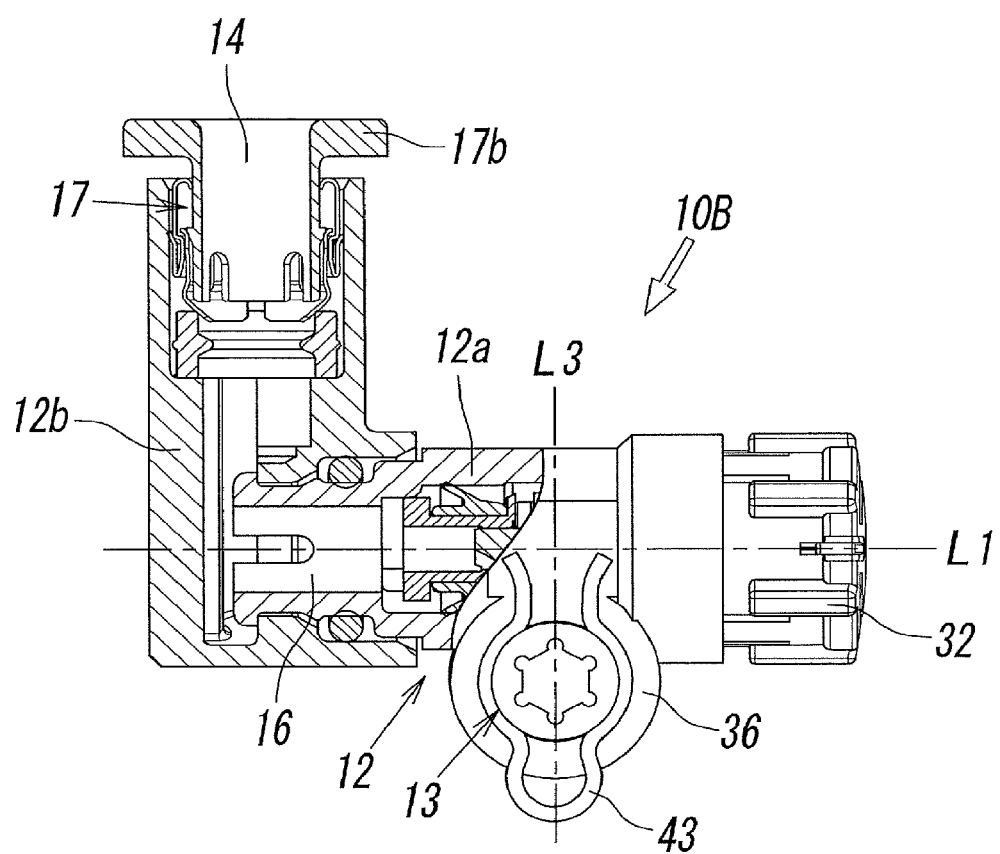
FIG. 11 is a cross-sectional view illustrating the speed controller of FIG. 10.

FIGS. 9 to 11 illustrate the speed controller of a second embodiment. The speed controller 10B of the second embodiment is different from the speed controller 10A of the first embodiment in that the port-formed portion 12b of the main body 12 of the speed controller 10B is disposed perpendicular to the valve accommodation portion 12a extending in the direction of the first axis L1. The port-formed portion 12b may be fixedly disposed parallel to the third axis L3. In the illustrated example, however, the port-formed portion 12b is disposed so as to be rotatable around the first axis L1.

Other features, modification examples, and operations of the second embodiment except for those described above are substantially the same as those of the first embodiment. Accordingly, the same reference numerals are used for major elements similar to those of the first embodiment, and duplicated description are omitted.

Figure 12:
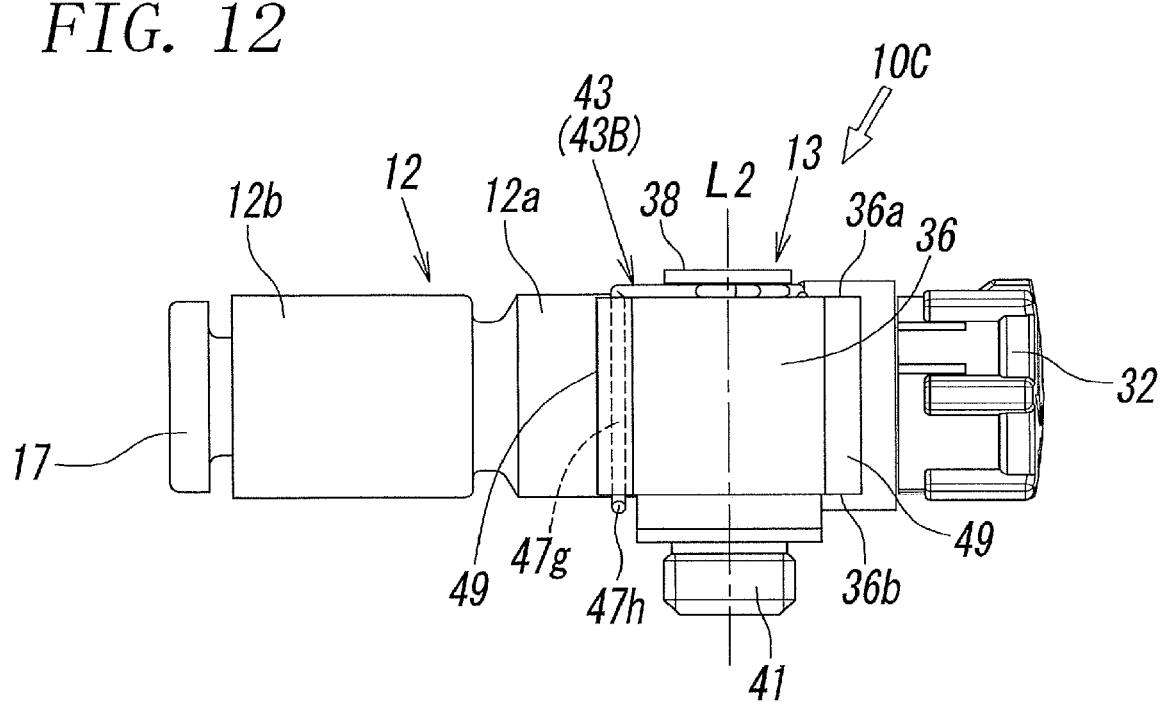
FIG. 12 is a side view illustrating the speed controller according to a third embodiment of the present invention.
Figure 13:
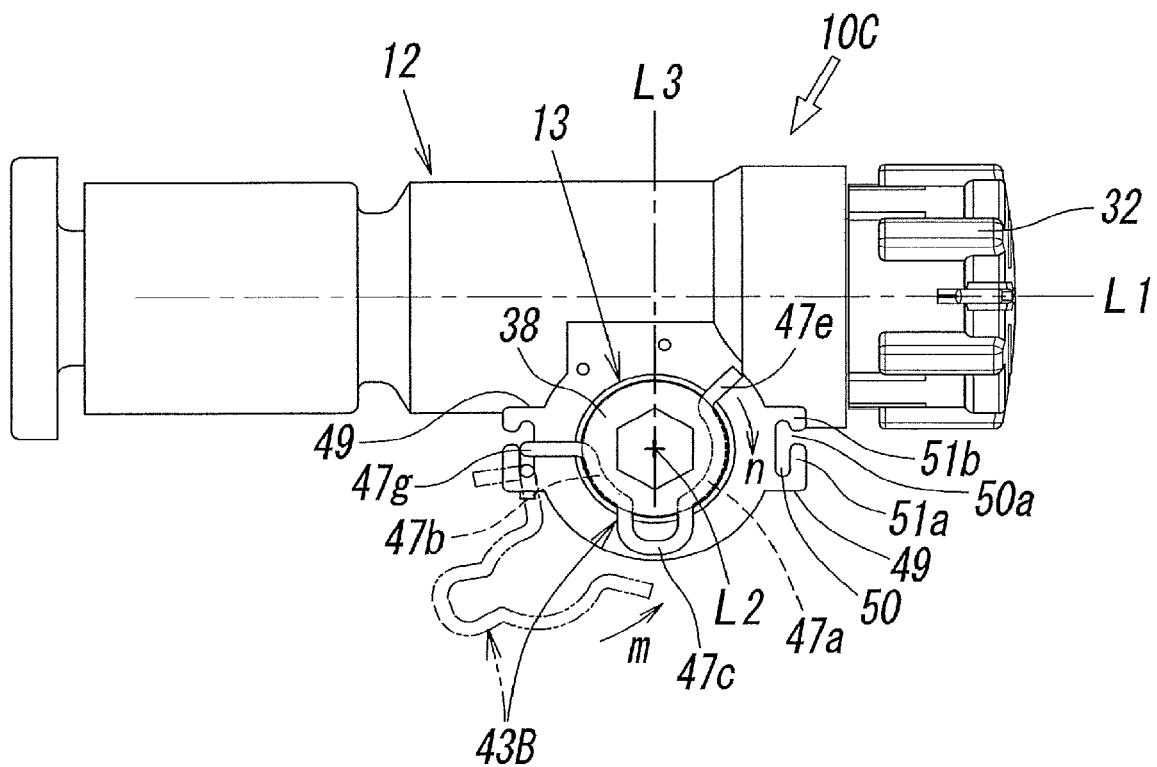
FIG. 13 is a plan view illustrating the speed controller of FIG. 12.

FIGS. 12 and 13 illustrate the speed controller of a third embodiment. A speed controller 10C of the third embodiment is different from the speed controller 10A of the first embodiment in that in the speed controller 10C, a clip 43B that forms the locking member 43 is configured such that when the clip 43B is detached from the connection portion 38 of the mounting body 13, the clip 43B is not completely separated from the bulging portion 36, but instead part of the clip 43B engages the bulging portion 36. With this configuration, when the clip 43B engages, or is detached from, the connection portion 38, the clip 43B is prevented from falling off and becoming lost or from falling in a narrow work space and becoming uncollectible.

For this purpose, groove-formed portions 49 are formed as projecting walls in respective right and left sides of the bulging portion 36 at positions opposing each other with the second axis L2 therebetween. A clip lock groove 50 is formed parallel to the second axis L2 in each of the groove-formed portions 49 from the top surface 36a to the bottom surface 36b of the bulging portion 36. The clip lock groove 50 is shaped like a flattened letter "C" that is elongated thinly in the direction of the third axis L3. A pair of groove edges 51a and 51b are formed at respective ends of right and left side walls of the clip lock groove 50. The pair of groove edges 51a and 51b protrudes in a direction of narrowing the width of the groove, and an opening 50a is provided therebetween.

Respective widths (i.e., protrusion heights) of the pair of groove edges 51a and 51b are not the same. The width of the groove edge 51b located near a proximal end of the bulging portion 36 (near the main body 12) is smaller than the width of the groove edge 51a located near a distal end of the bulging portion 36. Accordingly, the opening 50a is formed at a position closer to the main body 12 with respect to the midpoint of the width of the clip lock groove 50.

Figure 14:
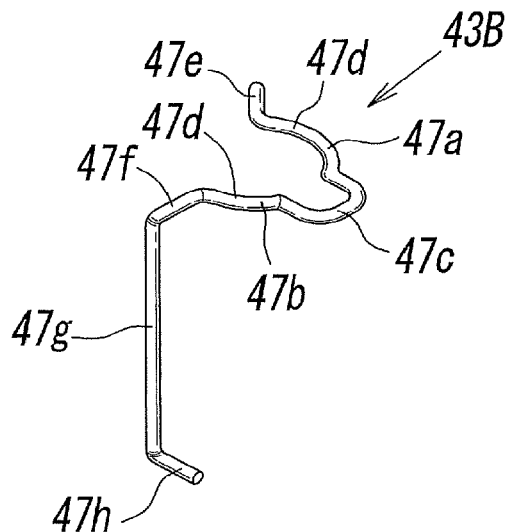
FIG. 14 is a perspective view illustrating a clip.

As illustrated in FIG. 14, the clip 43B includes a pair of right and left locking arms 47a and 47b that can deform elastically and an elastic deformation portion 47c at which proximal ends of the pair of locking arms 47a and 47b are joined to form a semicircle. A curved portion 47d that is curved so as to protrude convexly outward is formed in each of the pair of locking arms 47a and 47b. The curved portion 47d fits and engages the locking groove 38b of the connection portion 38. The lengths of respective arcs of the curved portions 47d that are formed in the pair of respective locking arms 47a and 47b are not the same. The length of the arc of the curved portion 47d formed in the first locking arm 47a is longer than the length of the arc of the curved portion 47d formed in the second locking arm 47b. The latter is approximately a half of the former.

A handling portion 47e to be used for attaching/detaching the clip 43B is formed at the end of the first locking arm 47a so as to protrude in a direction opposite to the second locking arm 47b.

The second locking arm 47b includes a horizontal arm portion 47f, a vertical arm portion 47g, and a locking portion 47h. The horizontal arm portion 47f extends from the end of the curved portion 47d in a direction opposite to the curved portion 47d of the first locking arm 47a and reaches one of the clip lock grooves 50. The vertical arm portion 47g extends downward from the end of the horizontal arm portion 47f through the clip lock groove 50 and reaches the bottom end of the clip lock groove 50. The locking portion 47h bends from the bottom end of the vertical arm portion 47g, extends horizontally, and engages the bottom end of the clip lock groove 50.

When the clip 43B does not engage the connection portion 38, the vertical arm portion 47g is in the state of fitting and engaging the inside of the clip lock groove 50 of the bulging portion 36 as indicated by the dotted line in FIG. 13. When the clip 43B is caused to engage the connection portion 38 from this state, the clip is turned in the direction of arrow m in the figure pivotally on the vertical arm portion 47g, and the respective ends of the curved portions 47d of the pair of locking arms 47a and 47b are pressed against the side surface of the connection portion 38 at the position of the locking groove 38b. The clip 43B is pressed further in this state. Consequently, the pair of locking arms 47a and 47b are opened elastically by the connection portion 38, and then the curved portions 47d proceed to a position indicated by the solid line at which the curved portions 47d fit the locking groove 38b and engage the locking groove 38b at this position.

When the clip 43B is detached from the connection portion 38, the clip 43B is turned in the direction of arrow n pivotally on the vertical arm portion 47g by pushing the handling portion 47e at the end of the first locking arm 47a. As a result, the elastic deformation portion 47c is caused to deform elastically, and respective curved portions 47d of the pair of locking arms 47a and 47b are detached from the locking groove 38b. Thus, the clip 43B can be turned to the position indicated by the dotted line. At this time, the clip 43B stays in the state of engaging the bulging portion 36 and thereby prevents the clip 43B from falling off and becoming lost or from falling in a narrow work space and becoming uncollectible.

The clip 43B can be removed from the clip lock groove 50 through the opening 50a.

When the main body 12 is joined invertedly to the mounting body 13 in an upside down manner, the clip 43B is temporarily removed from the clip lock groove 50 of the main body 12. The clip 43B is reinstalled in the opposite clip lock groove 50 after the main body 12 is turned upside down.

Other features, modification examples, and operations of the third embodiment except for those described above are substantially the same as those of the first embodiment. Accordingly, the same reference numerals are used for major elements similar to those of the first embodiment, and duplicated description are omitted.

Figure 15:
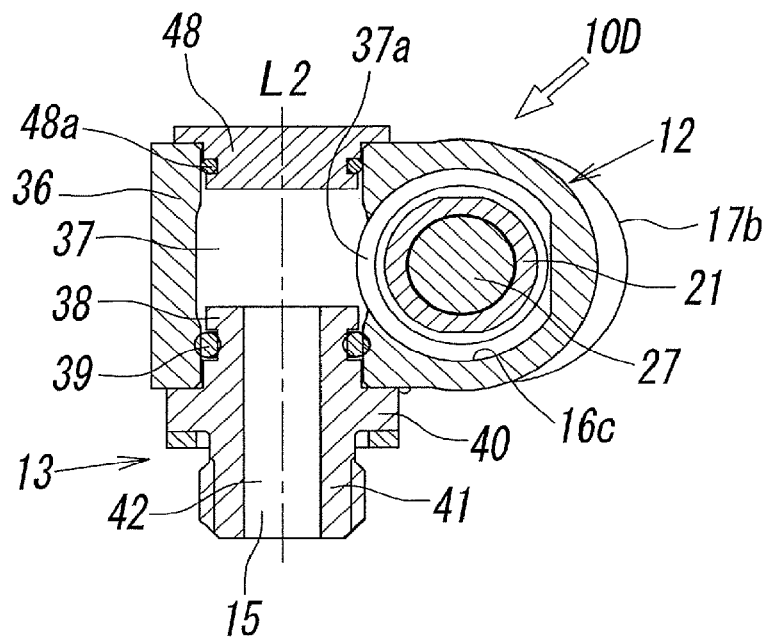
FIG. 15 is a cross-sectional view illustrating the speed controller according to a fourth embodiment of the present invention, in which the speed controller is cut at a position similar to that in FIG. 6.

FIG. 15 illustrates the speed controller of a fourth embodiment. The speed controller 10D of the fourth embodiment is different from the speed controller 10A of the first embodiment in that in the speed controller 10D, the length of the connection portion 38 of the mounting body 13 is shorter than the length of the connection hole 37. Accordingly, the end of the connection portion 38 is positioned in an intermediate portion in the connection hole 37, and the end of the connection hole 37 that is open is plugged by a plug 48 that is detachably mounted thereon. Reference numeral 48a in the figure denotes a sealing member.

The mounting body 13 is detachably mounted on the main body 12. The main body 12 can be connected to the mounting body 13 by turning the main body 12 upside down in the direction of the second axis L2. The plug 48 can be installed in either one of the ends of the connection hole 37.

In addition, the seat portion 40 of the mounting body 13 is formed hexagonally so that a wrench can engage the seat portion 40. The speed controller 10D can be installed in the cylinder port by using this seat portion 40.

Other features, modification examples, and operations of the fourth embodiment except for those described above are substantially the same as those of the first embodiment. Accordingly, the same reference numerals are used for major elements similar to those of the first embodiment, and duplicated description are omitted.

Figure 16:
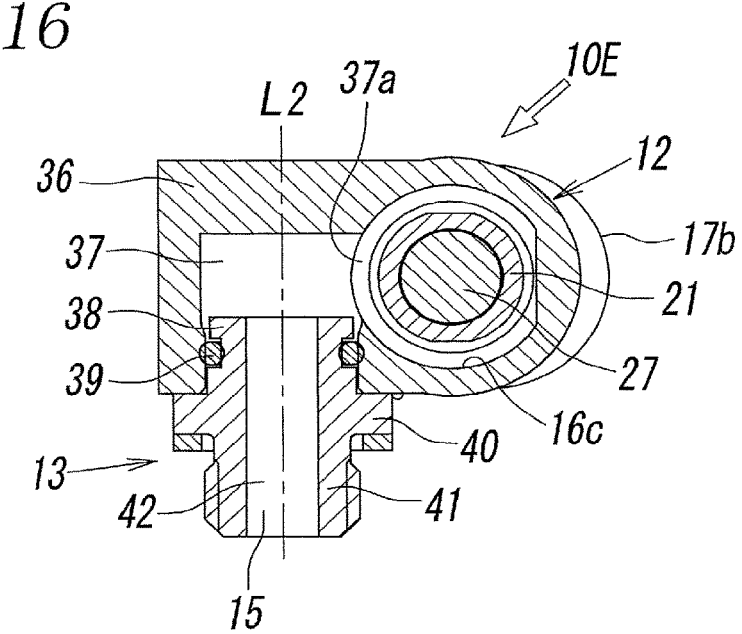
FIG. 16 is a cross-sectional view illustrating the speed controller according to a fifth embodiment of the present invention, in which the speed controller is cut at a position similar to that in FIG. 6.

FIG. 16 illustrates the speed controller of a fifth embodiment. The speed controller 10E of the fifth embodiment is different from the speed controller 10D of the fourth embodiment in that the connection hole 37 of the speed controller 10E does not pass through the bulging portion 36.

Accordingly, the plug 48 (see FIG. 15) plugging the end of the connection hole 37 is not necessary. However, the main body 12 cannot be connected to the mounting body 13 invertedly by turning the main body 12 upside down in the direction of the second axis L2.

In this case, the mounting body 13 can be formed integrally with the main body 12 as a portion of the main body 12 instead of forming the mounting body 13 separately and joining it to the main body 12 afterward.

Other features, modification examples, and operations of the fifth embodiment except for those described above are substantially the same as those of the fourth embodiment. Accordingly, the same reference numerals are used for major elements similar to those of the fourth embodiment, and duplicated description are omitted.

Figure 17:
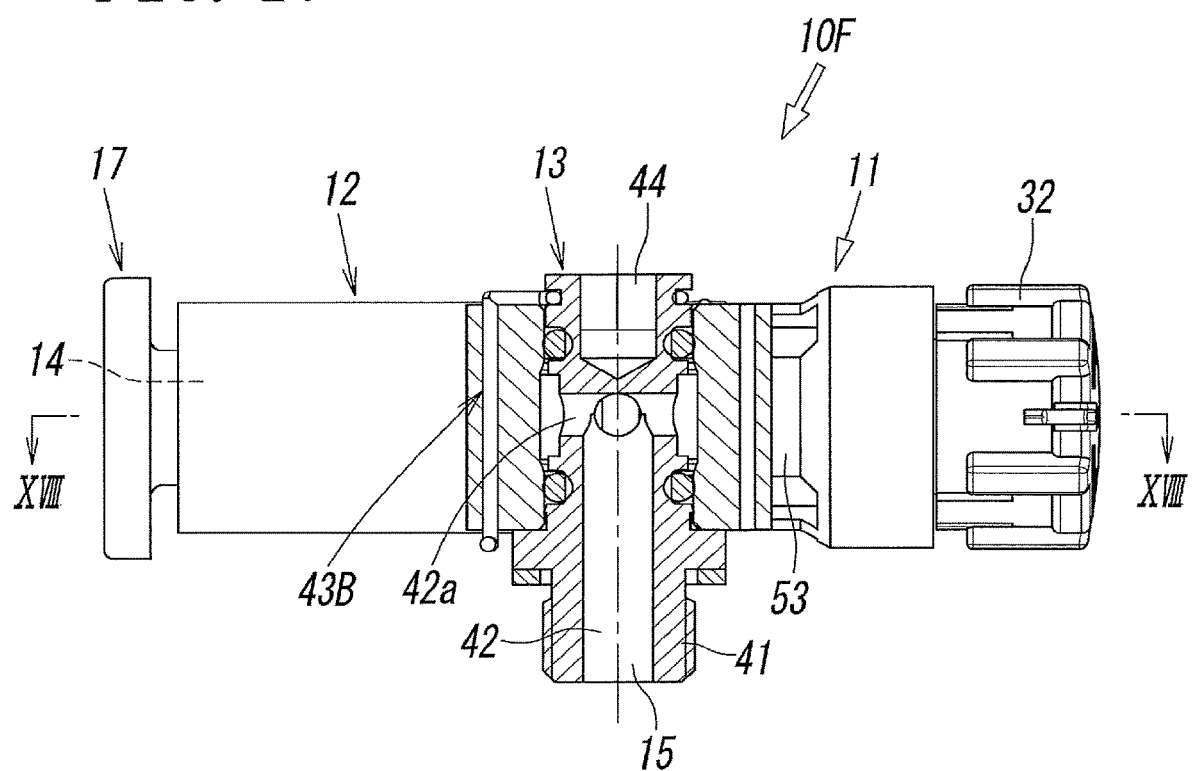
FIG. 17 is a partially broken side view illustrating the speed controller according to a sixth embodiment of the present invention.
Figure 18:
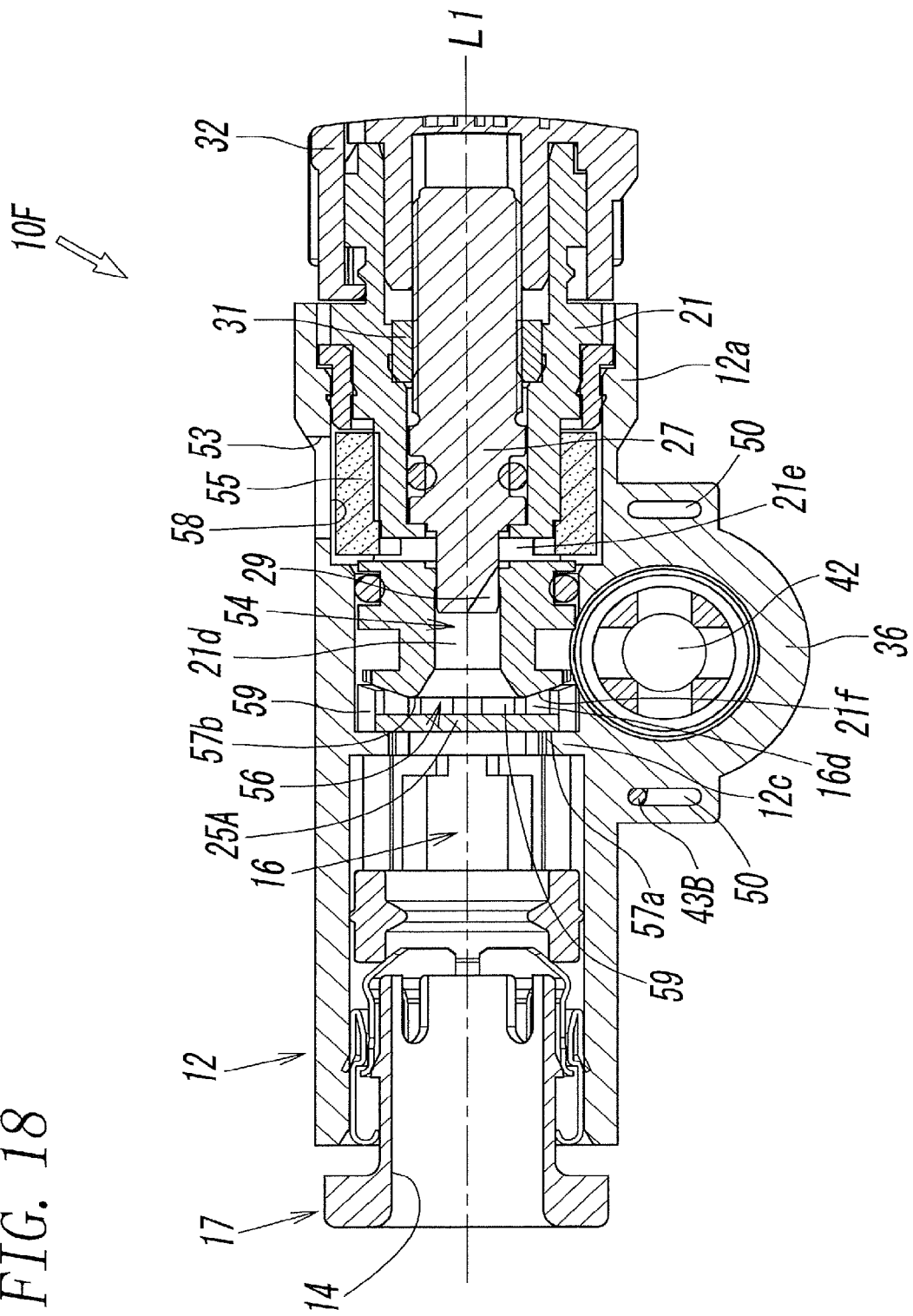
FIG. 18 is a cross section cut along line XVIII-XVIII in FIG. 17.

FIGS. 17 and 18 illustrate the speed controller of a sixth embodiment. The speed controller 10F of the sixth embodiment is different from the speed controller 10C of the third embodiment in that the speed controller 10F is configured to discharge the pressurized fluid coming from the fluid-pressure cylinder through a discharge hole 53 provided in the valve body 11.

For this purpose, multiple discharge holes 53 that are open to the outside are formed on the side of the valve accommodation portion 12a of the main body 12 so as to surround the needle valve holder 21. The discharge holes 53 are connected to a discharge channel 54 that is branched from the fluid channel 16 that connects the first port 14 and the second port 15 to each other. A member denoted by reference numeral 55 in the figure is a silencer that attenuates sounds released during fluid discharge. The silencer is made of a porous material, such as sintered metal or synthetic resin foam.

The discharge channel 54 is the channel that starts from a center hole 21d of the needle valve holder 21 and passes through the flow regulating hole 29 formed in the needle valve 27, a discharge communication hole 21e formed radially in the needle valve holder 21, and an annular discharge channel 58 that is formed around the needle valve holder 21. The discharge channel 54 reaches the discharge holes 53. The needle valve 27 is disposed inside the discharge channel 54. The discharge channel 54 is branched from the fluid channel 16 at a position of a valve chamber 56 that is formed between an annular partition wall 12c formed on the inner periphery of the main body 12 and the end portion of the needle valve holder 21.

An annular supply valve seating 57a is formed on the partition wall 12c so as to surround the fluid channel 16, and an annular discharge valve seating 57b is formed at the end of the needle valve holder 21 so as to surround the discharge channel 54. The supply valve seating 57a and the discharge valve seating 57b are disposed so as to face each other along the first axis L1. A surface 21f is provided at the end of the needle valve holder 21 so as to surround the discharge valve seating 57b. The surface 21f is a conical surface that inclines such that the surface gradually recedes in a direction away from the supply valve seating 57a as the distance to the outer edge of the surface 21f becomes smaller.

A check valve 25A that is shaped like a disk is accommodated inside the valve chamber 56 between the supply valve seating 57a and the discharge valve seating 57b so as to be displaceable in the direction of the axis L1. Multiple guide ribs 59 that extend in the direction of the axis L1 are disposed on the chamber wall of the valve chamber 56, in other words, the inside surface of the main body 12, so as to surround the outer periphery of the check valve 25A. Fluid grooves 16d are provided between adjacent guide ribs 59.

The guide ribs 59 are configured to guide displacement of the check valve 25A. Thus, the fluid grooves 16d form part of the fluid channel 16.

The check valve 25A operates in such a manner that when the pressurized fluid coming from the first port 14 acts on the check valve 25A, the check valve 25A occupies a first position, in other words, the check valve 25A is seated on the discharge valve seating 57b, and the discharge channel 54 is closed while the first port 14 and the second port 15 become in communication with each other. When the pressurized fluid coming from the second port 15 acts on the check valve 25A, the check valve 25A occupies a second position, in other words, the check valve 25A is seated on the supply valve seating 57a, and the first port 14 and the second port 15 are isolated from each other while the second port 15 becomes in communication with the discharge channel 54.

The check valve 25A is made of an elastic body having a sealing capability, such as synthetic rubber.

Figure 19:
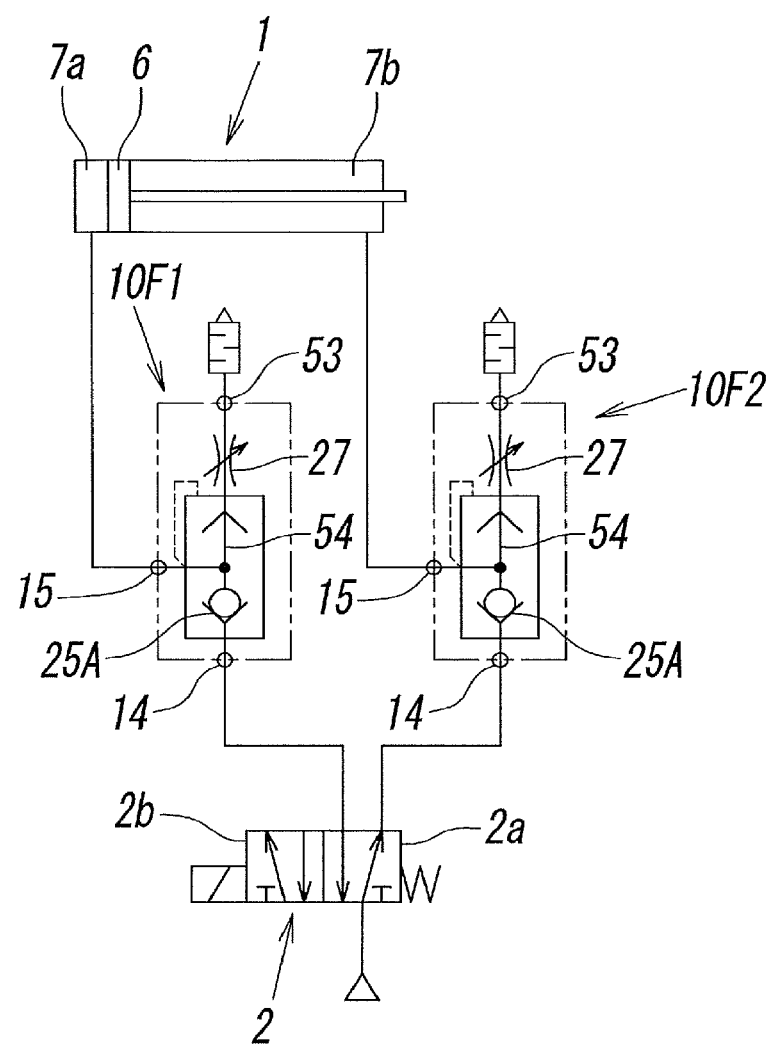
FIG. 19 is a circuit diagram when the speed controller according to the sixth embodiment controls the working speed of the fluid-pressure cylinder.
Figure 20:
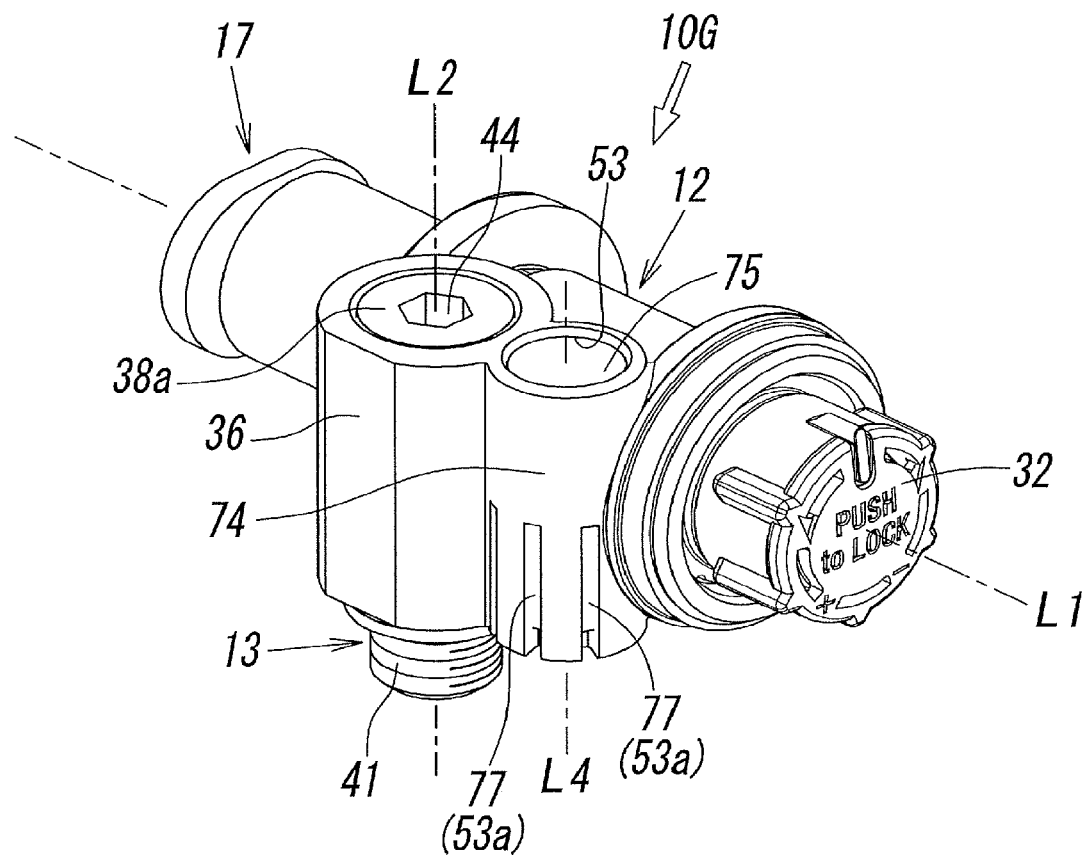
FIG. 20 is a perspective view illustrating the speed controller according to a seventh embodiment of the present invention.
Figure 21:
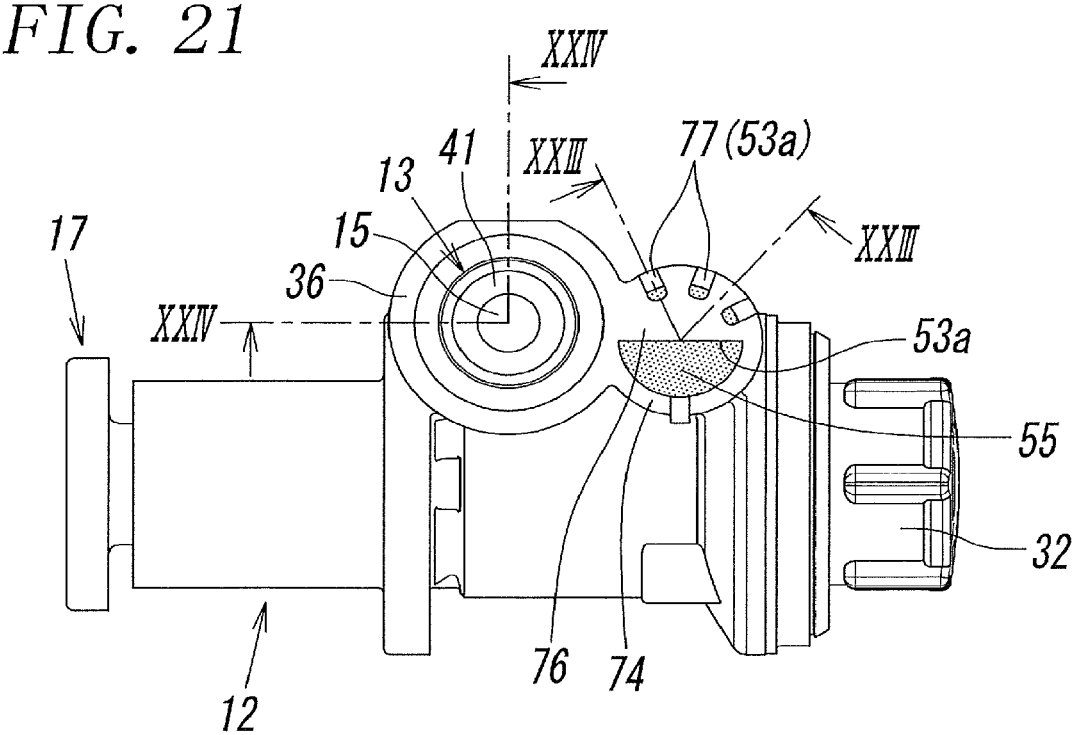
FIG. 21 is a bottom view illustrating the speed controller of FIG. 20.
Figure 22:
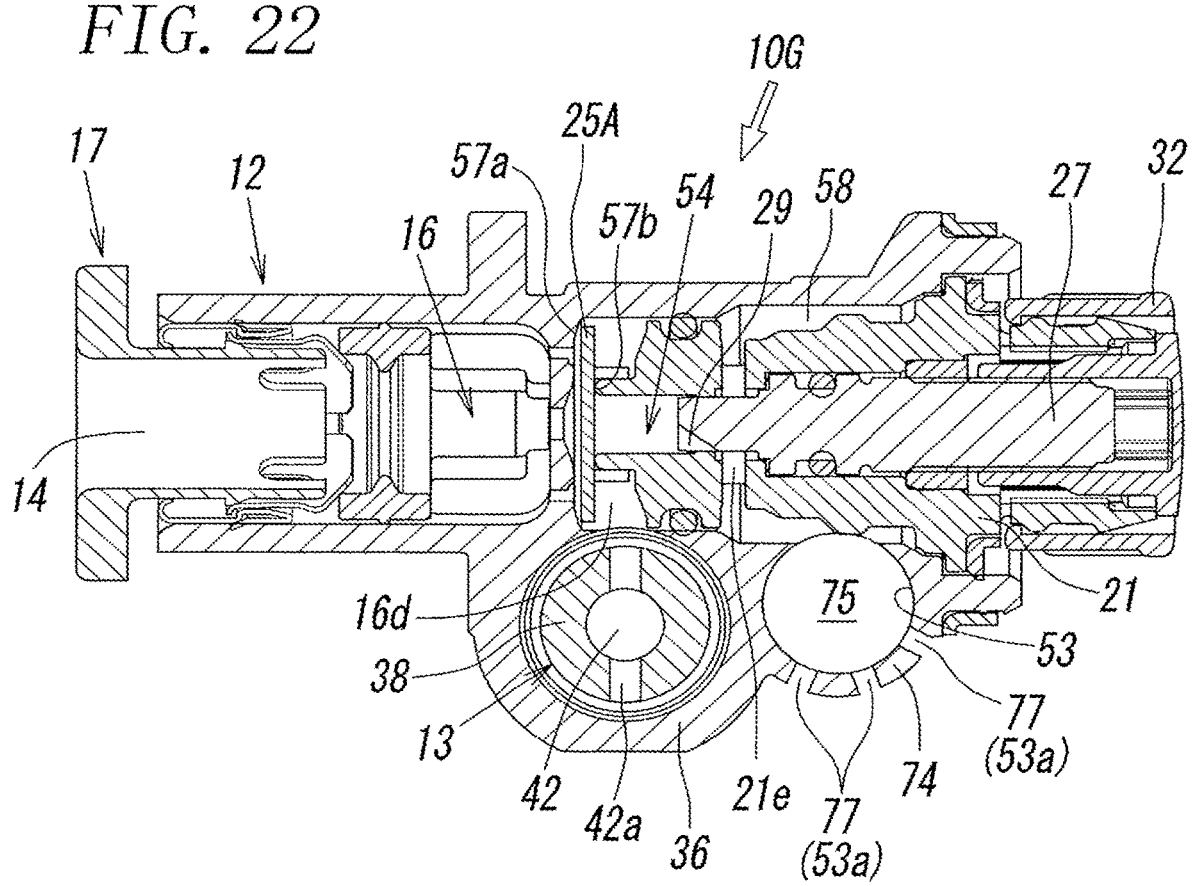
FIG. 22 is a cross-sectional plan view of the speed controller of FIG. 20 that is cut along a horizontal plane that includes a first axis.
Figure 23:
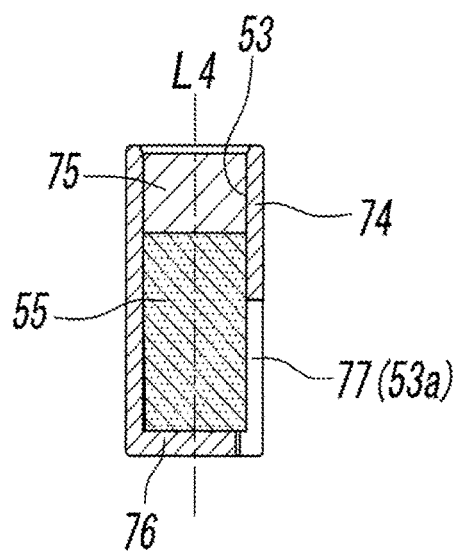
FIG. 23 is a cross section cut along line XXIII-XXIII in FIG. 21, in which the up-down direction is aligned with the up-down direction in FIG. 20.
Figure 24:
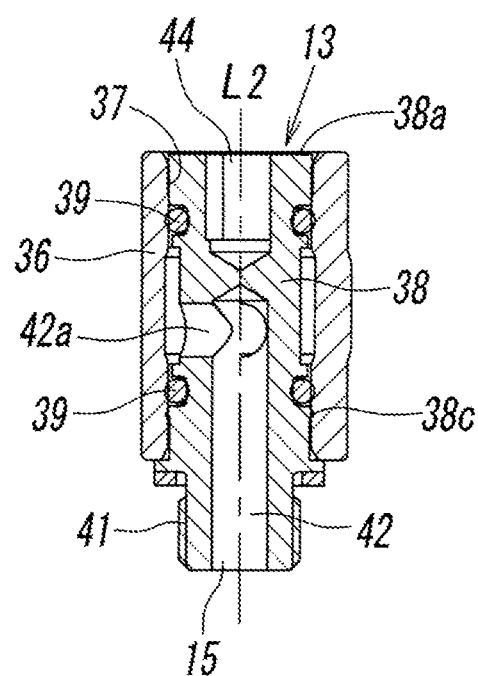
FIG. 24 is a cross section cut along line XXIV-XXIV in FIG. 21, in which the up-down direction is aligned with the up-down direction in FIG. 20.

FIG. 19 illustrates a circuit diagram when the speed controller 10F of the sixth embodiment controls the speed of the fluid-pressure cylinder 1.

FIG. 19 illustrates a case in which the electromagnetic valve 2 has been switched to the first position 2a by turning off the power and the piston 6 of the fluid-pressure cylinder 1 is at the retreat end position. In this case, in a second speed controller 10F2 that is connected to the rod-side chamber 7b, the check valve 25A occupies the first position and the first port 14 and the second port 15 become in communication with each other. On the other hand, in a first speed controller 10F1 that is connected to the head-side chamber 7a, the check valve 25A occupies the second position and the second port 15 becomes in communication with the discharge channel 54. As a result, pressurized fluid is supplied to the rod-side chamber 7b of the fluid-pressure cylinder 1 in a free flow state through the second speed controller 10F2, while the head-side chamber 7a is open to the atmosphere through the needle valve 27 and the discharge holes 53 of the first speed controller 10F1.

When the electromagnetic valve 2 is switched from this state to a second position 2b by turning on the power, the first port 14 of the first speed controller 10F1 is connected to the pressurized fluid source 3 and the first port 14 of the second speed controller 10F2 is open to the atmosphere. Subsequently, in the first speed controller 10F1, the check valve 25A occupies the first position and the first port 14 and the second port 15 are in communication with each other, while in the second speed controller 10F2, the check valve 25A occupies the second position and the second port 15 becomes in communication with the discharge channel 54. As a result, the pressurized fluid is supplied to the head-side chamber 7a of the fluid-pressure cylinder 1 in the free flow state through the first speed controller 10F1, while the pressurized fluid inside the rod-side chamber 7b is discharged to the atmosphere through the discharge holes 53 in such a manner that the needle valve 27 disposed in the discharge channel 54 of the second speed controller 10F2 regulates the flow rate. Thus, the piston 6 of the fluid-pressure cylinder 1 advances at a speed corresponding to the flow rate of the fluid discharged.

When the electromagnetic valve 2 is switched again to the first position 2a after the piston 6 reaches the advanced end position, the first speed controller 10A1 and the second speed controller 10A2 operate in reverse of the operation of advancing the piston 6. Thus, the piston 6 retreats to the retreat end position in FIG. 19.

Other features, modification examples, and operations of the sixth embodiment except for those described above are substantially the same as those of the third embodiment. Accordingly, the same reference numerals are used for major elements similar to those of the third embodiment. Elements not described in the third embodiment are denoted by the same reference numerals as used in the first embodiment, and duplicated description are omitted.

Note that the mounting structure for mounting the mounting body 13 onto the main body 12 in the speed controller 10F according to the sixth embodiment may be configured to be the same as the mounting structure of the speed controller described in either of the first, second, fourth, and fifth embodiments.

FIGS. 20 to 24 illustrate the speed controller a seventh embodiment. The speed controller 10G of the seventh embodiment is different from the speed controller 10F of the sixth embodiment in the mounting structure of mounting the mounting body 13 onto the bulging portion 36 of the main body 12 and in the structure of the discharge hole 53 disposed in the main body 12.

The mounting structure for mounting the mounting body 13 on the bulging portion 36 will be described first. The mounting body 13 is fixedly, not detachably, joined to the bulging portion 36. For this purpose, a projection 38c for engagement having a pointed end is formed on the outer periphery of the connection portion 38 of the mounting body 13 so as to surround the connection portion 38. The connection portion 38 is press fitted into the connection hole 37 of the bulging portion 36 to cause the projection 38c to engage the inside surface of the connection hole 37. The mounting body 13 is thereby fixedly installed in the bulging portion 36. At this time, the end portion 38a of the mounting body 13 is positioned so as not to protrude out of the connection hole 37.

The discharge hole 53 is provided inside a discharge portion 74 that is formed hollowly and disposed on the side of the main body 12. In other words, the discharge portion 74 is formed at a position adjacent to the bulging portion 36 and formed integrally with both the bulging portion 36 and the main body 12 so as to extend in the up-down direction along the bulging portion 36. The discharge hole 53 is formed inside the discharge portion 74 along a fourth axis L4 that intersects the first axis L1 orthogonally and is parallel to the second axis L2.

The top end of the discharge hole 53 is completely plugged by a lid 75 that is shaped like a short column and installed in the discharge hole 53 by press fitting, screw engagement, or any other suitable means. At the bottom end of the discharge hole 53, a semicircle portion near the main body 12 is closed by an end wall 76, and the other semicircle portion is open to the atmosphere, which serves as discharge openings 53a. Multiple elongated holes 77 are provided in a lower half portion of the side of the discharge portion 74 to open the discharge hole 53 to the atmosphere. The elongated holes 77 are shaped like slits and elongated in the direction of the fourth axis L4. The elongated holes 77 also constitute the discharge opening 53a. A silencer 55 that is made from synthetic resin foam and shaped like a column is disposed inside the discharge hole 53 so as to interpose between the lid 75 and the end wall 76. The silencer 55 may be shaped like a cylinder.

The height of the discharge portion 74 in the direction of the fourth axis L4 is equal to or less than the height H of the bulging portion 74.

Other features, modification examples, and operations of the seventh embodiment except for those described above are substantially the same as those of the sixth embodiment. Accordingly, the same reference numerals are used for major elements similar to those of the sixth embodiment, and duplicated description are omitted.

By disposing the discharge hole 53 in the above-described a manner, the length of the main body 12 can be made shorter compared with the case in which as in the speed controller 10F of the sixth embodiment, the discharge holes 53 are formed on the side of the main body 12 and elongated in the direction of the first axis L1 and the silencer 55 is accommodated so as to cover the discharge holes 53 inside the main body 12.

Note that the mounting structure for mounting the mounting body 13 onto the main body 12 in the speed controller 10G according to the seventh embodiment may be configured to be the same as the mounting structure of the speed controller described in either of the first, second, and fourth to sixth embodiments.

REFERENCE SIGNS LIST 1 fluid-pressure cylinder
4 cylinder port
10A-10G 10A1, 10A2 speed controller
11 valve body
12 main body
13 mounting body
14 first port
15 second port
16 fluid channel
16a first channel
16b second channel
25, 25A check valve
27 needle valve
29 flow regulating hole
32 handle
36 bulging portion
37 connection hole
38 connection portion
38a end portion
41 mounting portion
42 channel hole
43 locking member
44 work hole
53 discharge hole
54 discharge channel
55 silencer
56 valve chamber
57a supply valve seating
57b discharge valve seating
70 indicator portion
71 space
72 marker portion
74 discharge portion
L1 first axis
L2 second axis
L3 third axis
L4 fourth axis
H height of bulging portion
D diameter of main body

The invention claimed is:
1. A speed controller, comprising:
a check valve that controls a flow direction of pressurized fluid in a fluid channel that connects a first port and a second port to each other; and
a needle valve that controls flow rate of the pressurized fluid supplied to a fluid-pressure cylinder or discharged from the fluid-pressure cylinder, wherein a valve body of the speed controller includes a main body that extends along a first axis and a mounting portion to be mounted on a cylinder port of the fluid-pressure cylinder,
the mounting portion projects from a side of the main body along a second axis that intersects the first axis orthogonally,
the first port is formed in the main body and the needle valve and the check valve are disposed coaxially along the first axis,
the second port is formed in the mounting portion, and
a position at which the mounting body is connected to the side of the main body is away from the first axis in a direction of a third axis that orthogonally intersects the first axis and the second axis.

2. The speed controller according to claim 1, wherein
a bulging portion that projects in a direction of the third axis is formed on the side of the main body, and
the mounting portion is disposed in the bulging portion so as to protrude out of the bulging portion along the second axis.

3. The speed controller according to claim 2, wherein
a height of the bulging portion in a direction of the second axis is equal to or less than a diameter of the main body in the direction of the second axis.

4. The speed controller according to claim 2, wherein
a connection hole that is shaped circularly and extends along the second axis is formed in the bulging portion and the connection hole is in communication with the fluid channel,
the mounting portion is formed in a mounting body that is shaped cylindrically and separated from the main body,
a connection portion for engaging the inside of the connection hole is formed in the mounting body, and
a channel hole that connects the second port and the connection hole to each other is also formed in the mounting body.

5. The speed controller according to claim 4, wherein
the connection hole passes through the bulging portion,
an end of the connection portion is exposed to outside from the connection hole, and
a handling hole for engaging a wrench is formed at the end of the connection portion.

6. The speed controller according to claim 4, wherein
the connection hole passes through the bulging portion and an end of the connection portion protrudes out of the connection hole,
the main body and the mounting body are detachably connected to each other by detachably attaching a locking member to the end of the connection portion, the locking member causing the connection portion and the bulging portion to lock each other, and
a handling hole for engaging a wrench is formed at the end of the connection portion.

7. The speed controller according to claim 4, wherein
the main body and the mounting body are rotatable relative to each other around the second axis.

8. The speed controller according to claim 1, wherein
the fluid channel is branched into a first channel and a second channel which are disposed parallel to each other, and
the check valve is disposed in the first channel and the needle valve is disposed in the second channel.

9. The speed controller according to claim 1, wherein
the main body includes
a discharge hole through which pressurized fluid from the fluid-pressure cylinder is discharged,
a discharge channel that is branched from the fluid channel and is in communication with the discharge hole,
a valve chamber formed at a position at which the discharge channel is branched from the fluid channel, and
a supply valve seating and a discharge valve seating that are disposed so as to oppose each other in the valve chamber and to surround the fluid channel and the discharge channel, respectively,
the check valve is disposed in the valve chamber at a position between the supply valve seating and the discharge valve seating,
in the case in which the pressurized fluid from the first port acts on the check valve, the check valve is seated on the discharge valve seating and thereby causes the first port and the second port to be in communication with each other and closes the discharge channel, and
in a case in which the pressurized fluid from the second port acts on the check valve, the check valve is seated on the supply valve seating and thereby causes the first port and the second port to be isolated from each other and causes the second port to be in communication with the discharge channel.

10. The speed controller according to claim 9, wherein the check valve is shaped like a disk.

11. The speed controller according to claim 9, wherein
the discharge hole is formed inside a hollow discharge portion that is formed on the side of the main body so as to extend along a fourth axis that is parallel to the second axis and orthogonally intersects the first axis, and
a silencer that is made of a porous member is accommodated inside the discharge hole.

12. The speed controller according to claim 11, wherein
the discharge portion is formed on a side of the bulging portion so as to extend along the bulging portion, and
a height of the discharge portion in a direction of the fourth axis is equal to or less than a height of the bulging portion.

13. The speed controller according to claim 1, wherein
the needle valve is configured to advance/retreat along the first axis by manipulating a handle and an aperture area of a flow regulating hole is adjusted by the advance/retreat of the needle valve,
the handle is displaceable between a non-locking position at which advancing/retreating operation of the needle valve is enabled and a locking position at which the advancing/retreating operation of the needle valve is disabled, and
the valve body includes an indicator portion disposed therein for indicating whether the handle is at the locking position or at the non-locking position.

* * * * *